US010816994B2

(12) United States Patent
Tian et al.

(10) Patent No.: US 10,816,994 B2
(45) Date of Patent: Oct. 27, 2020

(54) METHOD AND SYSTEM FOR PROVIDING REMOTE ROBOTIC CONTROL

(71) Applicant: MIDEA GROUP CO., LTD., Foshan (CN)

(72) Inventors: Yuan Tian, San Jose, CA (US); Suresh Mani, San Jose, CA (US)

(73) Assignee: MIDEA GROUP CO., LTD., Foshan (CN)

(*) Notice: Subject to any disclaimer, the term of this patent is extended or adjusted under 35 U.S.C. 154(b) by 253 days.

(21) Appl. No.: 16/156,979

(22) Filed: Oct. 10, 2018

(65) Prior Publication Data

US 2020/0117213 A1   Apr. 16, 2020

(51) Int. Cl.
*G06F 3/0484* (2013.01)
*G01C 21/20* (2006.01)
(Continued)

(52) U.S. Cl.
CPC ......... *G05D 1/0274* (2013.01); *G01C 21/206* (2013.01); *G05D 1/005* (2013.01);
(Continued)

(58) Field of Classification Search
CPC .. G05D 1/0274; G05D 1/005; G06F 3/04845; G06F 3/016; G06F 3/04815; G06F 3/017; G06F 3/011
See application file for complete search history.

(56) References Cited

U.S. PATENT DOCUMENTS 5,502,638 A   3/1996   Takenaka
5,999,881 A   12/1999  Law et al.
(Continued)

FOREIGN PATENT DOCUMENTS

CN   101458083 A   6/2009
CN   101459857 A   6/2009
(Continued)

OTHER PUBLICATIONS

Midea Group Co. Ltd., International Searh Report and Written Opinion, PCT/CN2019/092147, dated Sep. 25, 2019, 10 pgs.
(Continued)

*Primary Examiner* — Alan D Hutchinson
*Assistant Examiner* — Andy Schneider
(74) *Attorney, Agent, or Firm* — Morgan, Lewis & Bockius LLP

(57) ABSTRACT

A virtual pointer object is displayed within a virtualized environment corresponding to a physical environment currently surrounding a robot. The virtualized environment is generated and updated in accordance with streaming environment data received from sensors collocated with the robot. First user input is detected via a haptic-enabled input device that causes the virtual pointer object to move along a movement path in the virtualized environment, where the movement path is constrained by simulated surfaces in the virtualized environment. Haptic feedback is generated via the haptic-enabled input device in accordance with simulated material and/or structural characteristics of the movement path. The virtualized environment is modified at the locations of marking inputs along the movement path and affects path planning for the robot within the first physical environment.

20 Claims, 13 Drawing Sheets

(51) Int. Cl.
  *G06F 3/01*    (2006.01)
  *G06F 3/0481*  (2013.01)
  *G05D 1/02*    (2020.01)
  *G05D 1/00*    (2006.01)

(52) U.S. Cl.
  CPC .......... *G06F 3/016* (2013.01); *G06F 3/04815* (2013.01); *G06F 3/04845* (2013.01)

(56) References Cited

U.S. PATENT DOCUMENTS

| | | | |
|---|---|---|---|
| 6,166,746 | A | 12/2000 | Inada et al. |
| 8,311,731 | B2 | 11/2012 | Sugiura et al. |
| 8,483,874 | B2 | 7/2013 | Kim et al. |
| 8,972,057 | B1 | 3/2015 | Freeman et al. |
| 9,411,335 | B2 | 8/2016 | Kim et al. |
| 9,947,230 | B2 | 4/2018 | Hu et al. |
| 2008/0306628 | A1 | 12/2008 | Ng-Thow-Hing et al. |
| 2010/0168950 | A1 | 7/2010 | Nagano |
| 2011/0035050 | A1 | 2/2011 | Kim et al. |
| 2011/0035087 | A1 | 2/2011 | Kim et al. |
| 2014/0168073 | A1* | 6/2014 | Chizeck .................. G06F 3/016 345/156 |
| 2016/0217617 | A1 | 7/2016 | Barribeau |
| 2017/0039859 | A1 | 2/2017 | Hu et al. |

FOREIGN PATENT DOCUMENTS

| | | |
|---|---|---|
| CN | 101887271 A | 11/2010 |
| CN | 102699914 A | 10/2012 |
| CN | 103302668 A | 9/2013 |
| CN | 108422435 A | 8/2018 |
| EP | 0556031 A2 | 8/1993 |
| JP | 2013061937 A | 4/2013 |
| JP | 2014079819 A | 5/2014 |

OTHER PUBLICATIONS

Midea Group Co. Ltd., International Search Report and Written Opinion, PCT/CN2019/092150, dated Sep. 17, 2019, 9 pgs.

Midea Group Co. Ltd., International Search Report and Written Opinion, PCT/CN2019/078039, dated Jul. 16, 2019, 10 pgs.

Jonathan Cacace, Alberto Finzi, and Vincenzo Lippiello. 2014. A mixed-initiative control system for an aerial service vehicle supported by force feedback. In Intelligent Robots and Systems (IROS 2014), 2014 IEEE/RSJ International Conference on. IEEE, 1230-1235.

Markus Sauer. 2010. Mixed-reality for enhanced robot teleoperation. (2010).

Shahram Izadi, David Kim, Otmar Hilliges, David Molyneaux, Richard Newcombe, Pushmeet Kohli, Jamie Shotton, Steve Hodges, Dustin Freeman, Andrew Davison, and others. 2011. KinectFusion: real-time 3D reconstruction and interaction using a moving depth camera. In Proceedings of the 24th annual ACM symposium on User interface software and technology. ACM, 559-568.

Tian, Notice of Allowance, U.S. Appl. No. 16/156,969, dated Nov. 20, 2019, 10 pgs.

Yuan Tian, Chao Li, Xiaohu Guo, and Balakrishnan Prabhakaran. 2017. Real Time Stable Haptic Rendering of 3D Deformable Streaming Surface. In Proceedings of the 8th ACM on Multimedia Systems Conference. ACM, 136-146.

* cited by examiner

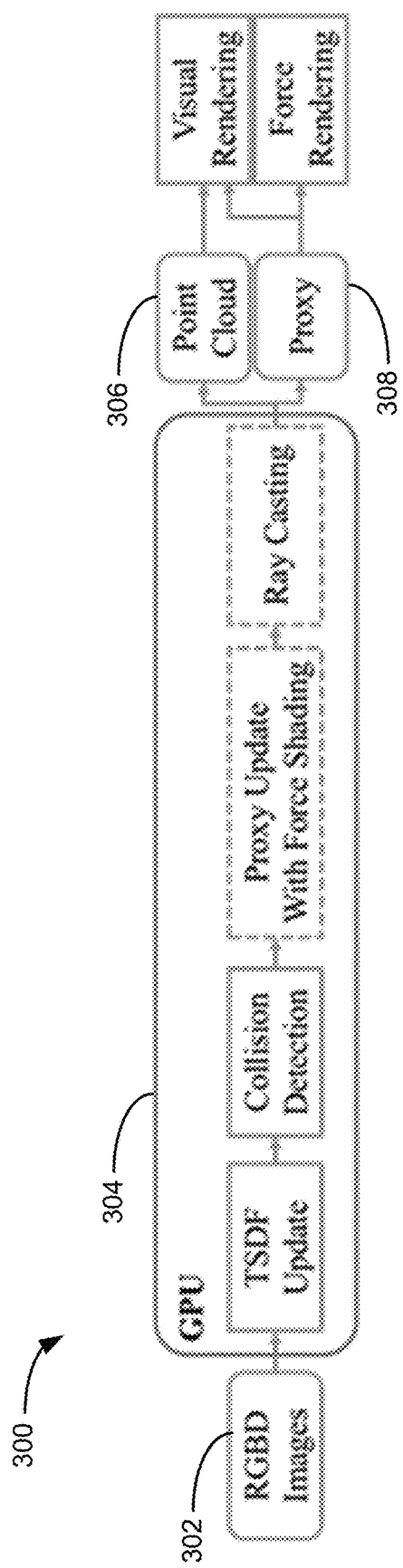
Figure 3
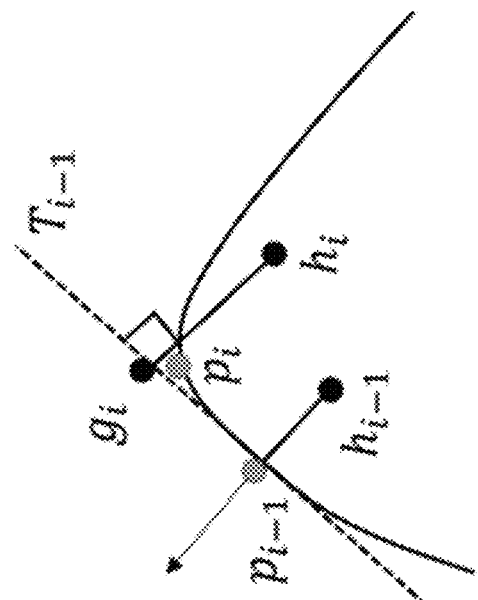
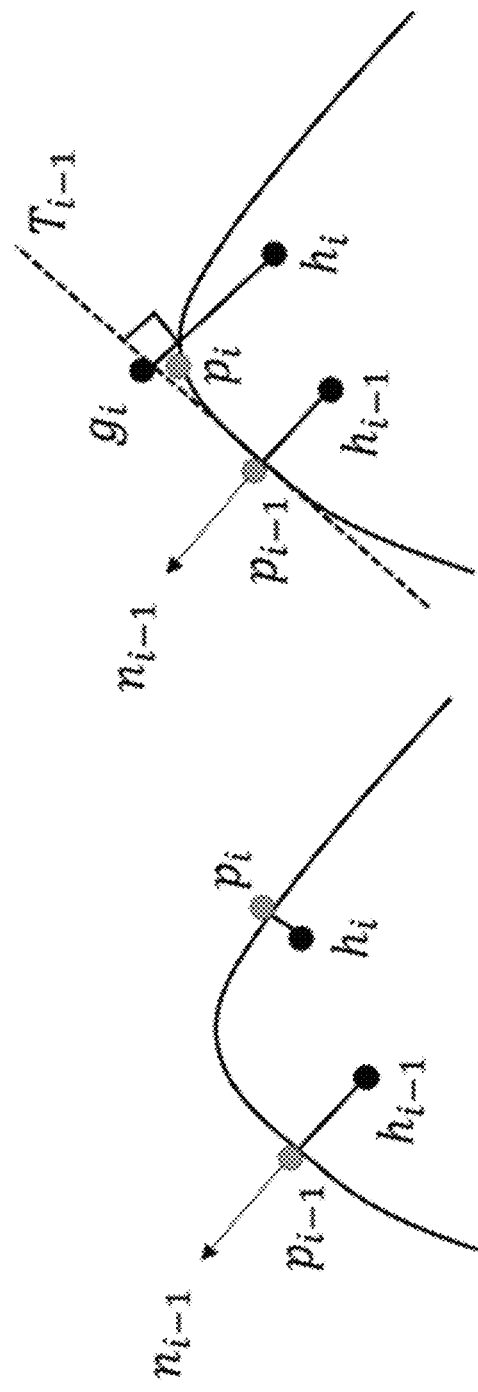
Figure 4

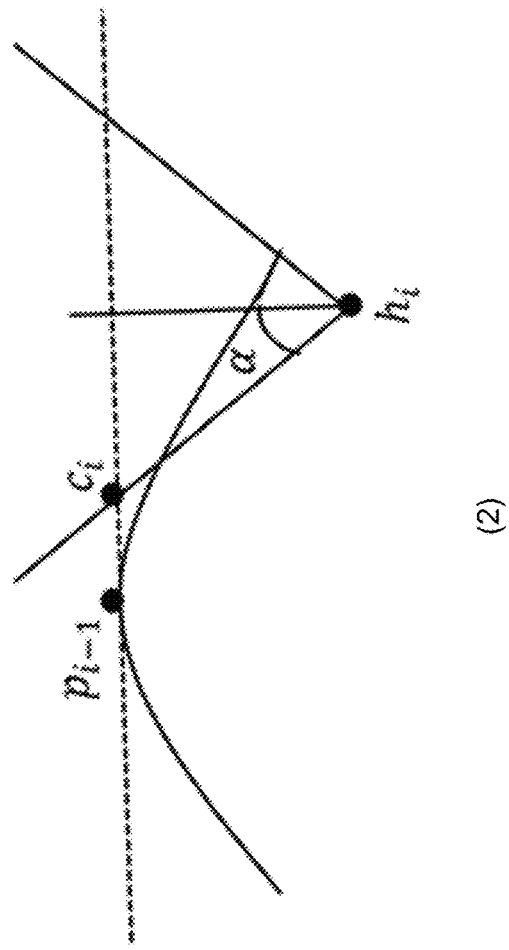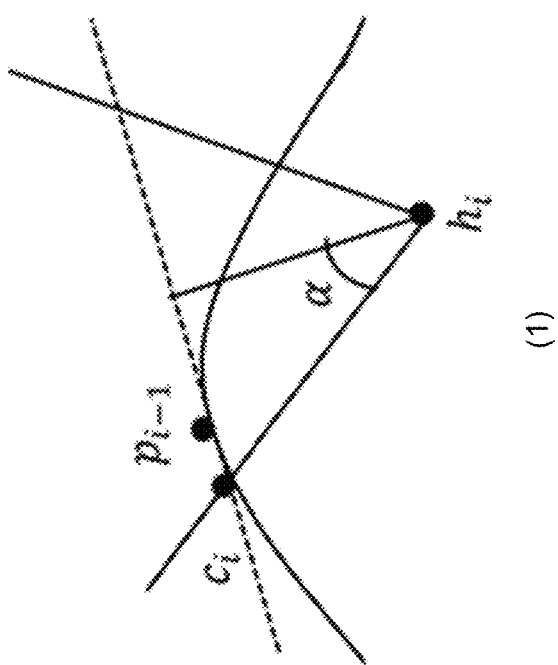
Figure 5
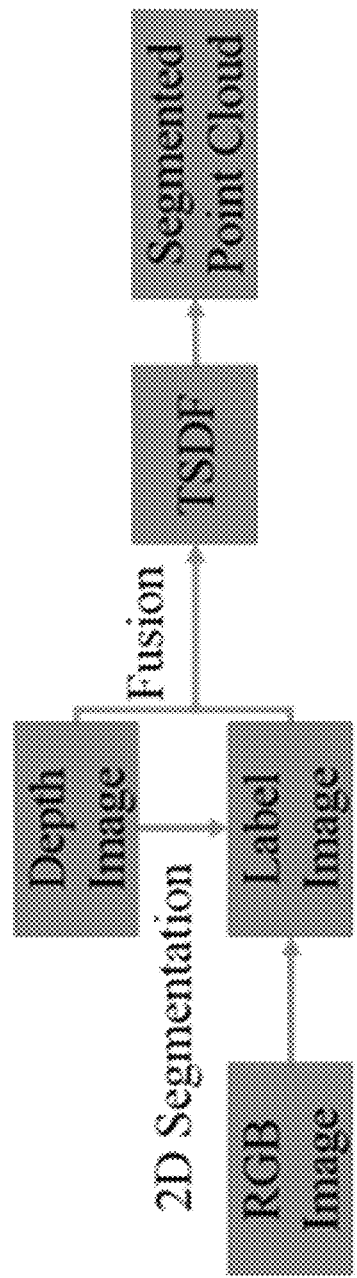
Figure 6

800

802 At a computing device having one or more processors and memory, wherein the computing device is communicably coupled to a robot and is configured to generate a planned path for the robot in accordance with a first set of preprogrammed path-planning instructions, and the robot is configured to navigate within a physical environment in accordance with the planned path received from the computing device and locally-stored path-execution instructions:

804 Display a control user interface via a display generation component coupled to the computing device, including displaying a virtual pointer object within a virtualized environment corresponding to a first physical environment currently surrounding the robot, wherein the virtualized environment is generated and updated in accordance with streaming environment data received from a first set of sensors collocated with the robot

806 While displaying the virtual pointer object in the virtualized environment, detecting first user input via a haptic-enabled input device, including detecting a first movement input and one or more marking inputs at one or more locations along a movement path of the virtual pointer object in the virtualized environment

810 In response to detecting the first user input:

812 Move the virtual pointer object along a first movement path in the virtualized environment in accordance with the first movement input, wherein the first movement path is constrained by one or more simulated surfaces in the virtualized environment

814 Generate haptic feedback via the haptic-enabled input device in accordance with simulated material and/or structural characteristics of the first movement path in the virtualized environment

816 Modify at least a portion of the virtualized environment that corresponds to the locations of the one or more marking inputs in the virtualized environment, wherein the modified virtualized environment replaces the virtualized environment as environment basis for path planning for the robot within the first physical environment that is performed by the computing device in accordance with the first set of preprogrammed path-planning instructions

902 At a computing device having one or more processors and memory, wherein the computing device is communicably coupled, via a network, to a set of sensors and a robot that are collocated in a first physical environment:

904 Receive an environment data stream from the set of sensors, the environment data stream including correlated image and depth data capturing the first physical environment

906 Display, via a display generation component, a virtualized representation of the first physical environment, in a user interface region, wherein the virtualized representation of the first physical environment is generated and updated in accordance with the environment data stream

908 While displaying the virtualized representation of the first physical environment, receive a marking input from a haptic-enabled input device, wherein a position of the marking input in the virtualized representation of the first physical environment is determined in accordance with the marking input and is constrained by the a first virtualized surface in the virtualized representation of the first physical environment

910 In response to receiving the marking input, performing object segmentation from the position of the marking input on the correlated image and depth data, including, for a respective time-step in updating the virtualized representation of the first physical environment in accordance with the environment data stream:

912 Cluster pixels from a first position in the image data that corresponds to the position of the marking input to form a first cluster

914 Segment out a first labeled object based on the first cluster and the depth data corresponding to the first cluster

916 Fuse the first labeled object and the depth data into a first Truncated Signed Distance Function (TSDF) representation of the first physical environment corresponding to the respective time-stepout a first labeled object based on the first cluster and the depth data corresponding to the first cluster

918 Obtain a first segmented point cloud from the first TSDF representation fused with the first labeled object and the depth data corresponding to the first cluster

1002 At a computing device having one or more processors and memory, wherein the computing device is communicably coupled to a robot and is configured to generate a planned path for the robot in accordance with a first set of preprogrammed path-planning instructions, and the robot is configured to navigate within a physical environment in accordance with the planned path received from the computing device and locally-stored path-execution instructions:

1004 Display a control user interface via a display generation component coupled to the computing device, including displaying a virtualized environment corresponding to a first physical environment currently surrounding the robot, wherein the virtualized environment is generated and updated in accordance with streaming environment data received from a first set of sensors collocated with the robot

1006 While displaying the virtualized environment, detect a first user input inserting a first virtual object at a first location in the virtualized environment

1008 In response to detecting the first user input, modify the first virtualized environment in accordance with the insertion of the first virtual object at the first location, wherein the first virtual object at the first location causes the robot to execute a first navigation path in the physical environment that is generated in accordance with the first set of pre-programmed path-planning instructions

1010 While displaying the first virtual object at the first location in the virtualized environment and while the robot is executing the first navigation path in the physical environment, detect a second user input, including detecting a first movement input directed to the first virtual object via a haptic-enabled input device

1012 In response to detecting the second user input, move the first virtual object along a first movement path to a second location in the virtualized environment in accordance with the first movement input, wherein the first movement path is constrained by one or more simulated surfaces in the virtualized environment, wherein the first virtual object at the second location causes the robot to execute a modified navigation path in the physical environment that is generated in accordance with the first set of pre-programmed path-planning instructions

Figure 10

METHOD AND SYSTEM FOR PROVIDING REMOTE ROBOTIC CONTROL

TECHNICAL FIELD

This relates generally to robotic control, including but not limited to providing mixed-initiative remote robotic control.

BACKGROUND

Today, robots are being used to perform or assist in many tasks that previously were performed by human beings. In some instances, robots are better suited for certain tasks than humans due to their precision in movement and control and their highly customizable designs and operation modes. Some suitable tasks for remotely controlled robots include tasks in hazardous environments, such as natural disaster areas, toxic environment, virus or radiation contaminated environment, etc. In some examples, tasks that are highly repetitive and tedious, and/or physically strenuous tasks, such as performing household chores, organizing warehouse inventories, routine care and assistance to the disabled and/or elderly, etc., can benefit greatly from robotic assistance.

Although teleoperation and complete automation are two modes of robotic control that are widely used today, the kinds of tasks that can be performed using these two modes of control are limited. For example, with teleoperation, a human operator precisely controls every move of the robot by performing a corresponding control movement in real-time while watching a streaming video of the scene in which the robot is operating. The teleoperation mode of control requires a highly skilled human operator to be fully engaged (e.g., physically and mentally) in real-time throughout performance of a task, which severely limits its usefulness and applications (e.g., due to the burdens and requirements placed on the human operators). The full automation mode of control requires artificial intelligence to be built into the robot control programs, which cannot adapt to highly varied operation scenarios and limits its usefulness and applications.

In a mixed-initiative robotic control mode, a human operator provides high-level task-oriented instructions, and relies on the robot's pre-programming to determine the exact movement and operations to be performed to achieve the high-level instructions. Mixed-initiative robotic control alleviates some burdens and requirements placed on the human operators, and takes advantage of the robot's capabilities in terms of precision, stamina, robustness, and relative immunity to hazards.

It is challenging to provide an intuitive and efficient human-machine interface that facilitates remote mixed-initiative robotic control. Good techniques for supporting indirect and/or intermittent intervention in a robot's operation (e.g., navigation and/or object manipulation) in real-time over a network are in great need.

SUMMARY

Accordingly, there is a great need for mixed-initiative robotic control techniques where a human operator controlling the robot visualizes a 3D scene as perceived by the robot in real-time and guides the robot's actions on a high-level (as opposed to controlling the robot via teleoperation) using indirect and/or intermittent instructions and inputs. When providing remote mixed-initiative control to robots, a mixed reality environment is utilized for the user to perceive the 3D scene and provide guidance inputs. The mixed reality environment is a combination of a virtualized representation of the physical environment as perceived by the robot as well as virtual markers and virtual objects that are placed into the virtualized representation of the physical environment. This technique provides the user more freedom and information during the interaction with the physical environment via the robot, such as switching viewpoints in real-time, inspecting selected portions of the environment, receiving augmentation of visual information (e.g., texture information, physical property information, motion and appearance history, etc.).

In this disclosure, embodiments of a haptic-enabled mixed reality system that provides haptic interfaces to interact with a virtualized representation of a physical environment and to provide remote high-level guidance to mobile robots in performing high-level tasks are described. The system includes a local site with a mobile robot equipped with Red Green Blue Depth (RGBD) sensors, and a remote site with a user operating a haptic-enabled input/output (I/O) device. A three-dimensional virtualized real-world scene is generated from streaming RGBD data using real-time dense mapping. The user can use the haptic-enabled input device to "touch" and experience physical characteristics of surfaces and objects within the scene, to mark the scene to indicate virtual routes, passages, obstacles, and/or targets for the robot in the scene, and to add virtual objects to the scene that alter the scene's composition from the perspective of the robot and thereby indirectly influence the exact operation that is performed by the robot in accordance with preprogrammed instructions. In some embodiments, the system performs physics simulation for a virtual object's interactions with other objects in the scene, to help the user experience the scene and more accurately determine where to place the virtual object in the scene. In some embodiments, real-time user assisted object segmentation is performed. The user uses the haptic-enabled input device to mark a location in the scene, and an object is segmented from the scene by a region growing method from the marked location. In some embodiments, a new processing pipeline for haptic rendering is used to handle proxy update. The proposed proxy update method with force shading that is reflective of friction and haptic textures is more stable and more realistically handles intersecting boundaries of different planes in the scene. In some embodiments, prediction of actual robot position is made in light of expected network latency, such that real-time operation and control of the robot over a latency network is more smooth (e.g., with less jerky, back-forth movement of the robot).

In one aspect, a method of providing mixed-initiative robotic control is performed at a computing device having one or more processors and memory, wherein the computing device is communicably coupled to a robot and is configured to generate a planned path for the robot in accordance with a first set of preprogrammed path-planning instructions, and the robot is configured to navigate within a physical environment in accordance with the planned path received from the computing device and locally-stored path-execution instructions. The method includes: displaying a control user interface via a display generation component coupled to the computing device, including displaying a virtual pointer object within a virtualized environment corresponding to a first physical environment currently surrounding the robot, wherein the virtualized environment is generated and updated in accordance with streaming environment data received from a first set of sensors collocated with the robot; while displaying the virtual pointer object in the virtualized environment, detecting first user input via a haptic-enabled input device, including detecting a first movement input and one or more marking inputs at one or more locations along a movement path of the virtual pointer object in the virtualized environment; and in response to detecting the first user input: moving the virtual pointer object along a first movement path in the virtualized environment in accordance with the first movement input, wherein the first movement path is constrained by one or more simulated surfaces in the virtualized environment; generating haptic feedback via the haptic-enabled input device in accordance with simulated material and/or structural characteristics of the first movement path in the virtualized environment; and modifying at least a portion of the virtualized environment that corresponds to the locations of the one or more marking inputs in the virtualized environment, wherein the modified virtualized environment replaces the virtualized environment as environment basis for path planning for the robot within the first physical environment that is performed by the computing device in accordance with the first set of preprogrammed path-planning instructions.

In one aspect, a method of performing interactive object segmentation from streaming surfaces is performed at a computing device having one or more processors and memory, wherein the computing device is communicably coupled, via a network, to a set of sensors and a robot that are collocated in a first physical environment. The method includes: receiving an environment data stream from the set of sensors, the environment data stream including correlated image and depth data capturing the first physical environment; displaying, via a display generation component, a virtualized representation of the first physical environment, in a user interface region, wherein the virtualized representation of the first physical environment is generated and updated in accordance with the environment data stream; while displaying the virtualized representation of the first physical environment, receiving a marking input from a haptic-enabled input device, wherein a position of the marking input in the virtualized representation of the first physical environment is determined in accordance with the marking input and is constrained by the a first virtualized surface in the virtualized representation of the first physical environment; and in response to receiving the marking input, performing object segmentation from the position of the marking input on the correlated image and depth data, including, for a respective time-step in updating the virtualized representation of the first physical environment in accordance with the environment data stream: clustering pixels from a first position in the image data that corresponds to the position of the marking input to form a first cluster; segmenting out a first labeled object based on the first cluster and the depth data corresponding to the first cluster; fusing the first labeled object and the depth data into a first Truncated Signed Distance Function (TSDF) representation of the first physical environment corresponding to the respective time-step; and obtaining a first segmented point cloud from the first TSDF representation fused with the first labeled object and the depth data corresponding to the first cluster.

In an aspect, a method of providing mixed-initiative robotic control is performed at a computing device having one or more processors and memory, wherein the computing device is communicably coupled to a robot and is configured to generate a planned path for the robot in accordance with a first set of preprogrammed path-planning instructions, and the robot is configured to navigate within a physical environment in accordance with the planned path received from the computing device and locally-stored path-execution instructions. The method includes: displaying a control user interface via a display generation component coupled to the computing device, including displaying a virtualized environment corresponding to a first physical environment currently surrounding the robot, wherein the virtualized environment is generated and updated in accordance with streaming environment data received from a first set of sensors collocated with the robot; while displaying the virtualized environment, detecting a first user input inserting a first virtual object at a first location in the virtualized environment; in response to detecting the first user input, modifying the first virtualized environment in accordance with the insertion of the first virtual object at the first location, wherein the first virtual object at the first location causes the robot to execute a first navigation path in the physical environment that is generated in accordance with the first set of pre-programmed path-planning instructions; while displaying the first virtual object at the first location in the virtualized environment and while the robot is executing the first navigation path in the physical environment, detecting a second user input, including detecting a first movement input directed to the first virtual object via a haptic-enabled input device; and in response to detecting the second user input: moving the first virtual object along a first movement path to a second location in the virtualized environment in accordance with the first movement input, wherein the first movement path is constrained by one or more simulated surfaces in the virtualized environment, wherein the first virtual object at the second location causes the robot to execute a modified navigation path in the physical environment that is generated in accordance with the first set of pre-programmed path-planning instructions.

In accordance with some implementations, a computing system includes one or more processors, memory, and one or more programs; the one or more programs are stored in the memory and configured to be executed by the one or more processors and the one or more programs include instructions for performing the operations of any of the methods described above. In accordance with some implementations, a non-transitory computer readable storage medium has stored therein instructions which when executed by a computing system with one or more processors, cause the computing system to perform the operations of any of the methods described above. In accordance with some implementations, a computing system includes means for performing the operations of any of the methods described above.

Additional advantages of the disclosed systems and methods are described throughout this disclosure, and/or are apparent to a person skilled in the art in light of the disclosure provided herein.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 3 illustrates an exemplary processing pipeline for real-time visual and haptic rendering on the remote site of the mixed-initiative robotic control environment, in accordance with some implementations.

FIG. 4 illustrates a proxy update method using force shading, in accordance with some embodiments.

FIG. 5 illustrates proxy update for friction, in accordance with some embodiments.

FIG. 6 illustrates an exemplary processing pipeline for interactive region growing 2D segmentation method, in accordance with some embodiments.

FIG. 8 is a flowchart of a method of providing mixed-initiative robotic control, in accordance with some embodiments.

FIG. 9 is a flowchart of a method of performing interactive object segmentation from streaming surfaces, in accordance with some embodiments.

FIG. 10 is a flowchart of a method of providing mixed-initiative robotic control, in accordance with some embodiments.

Like reference numerals refer to corresponding parts throughout the several views of the drawings.

DESCRIPTION OF IMPLEMENTATIONS

Figure 1:
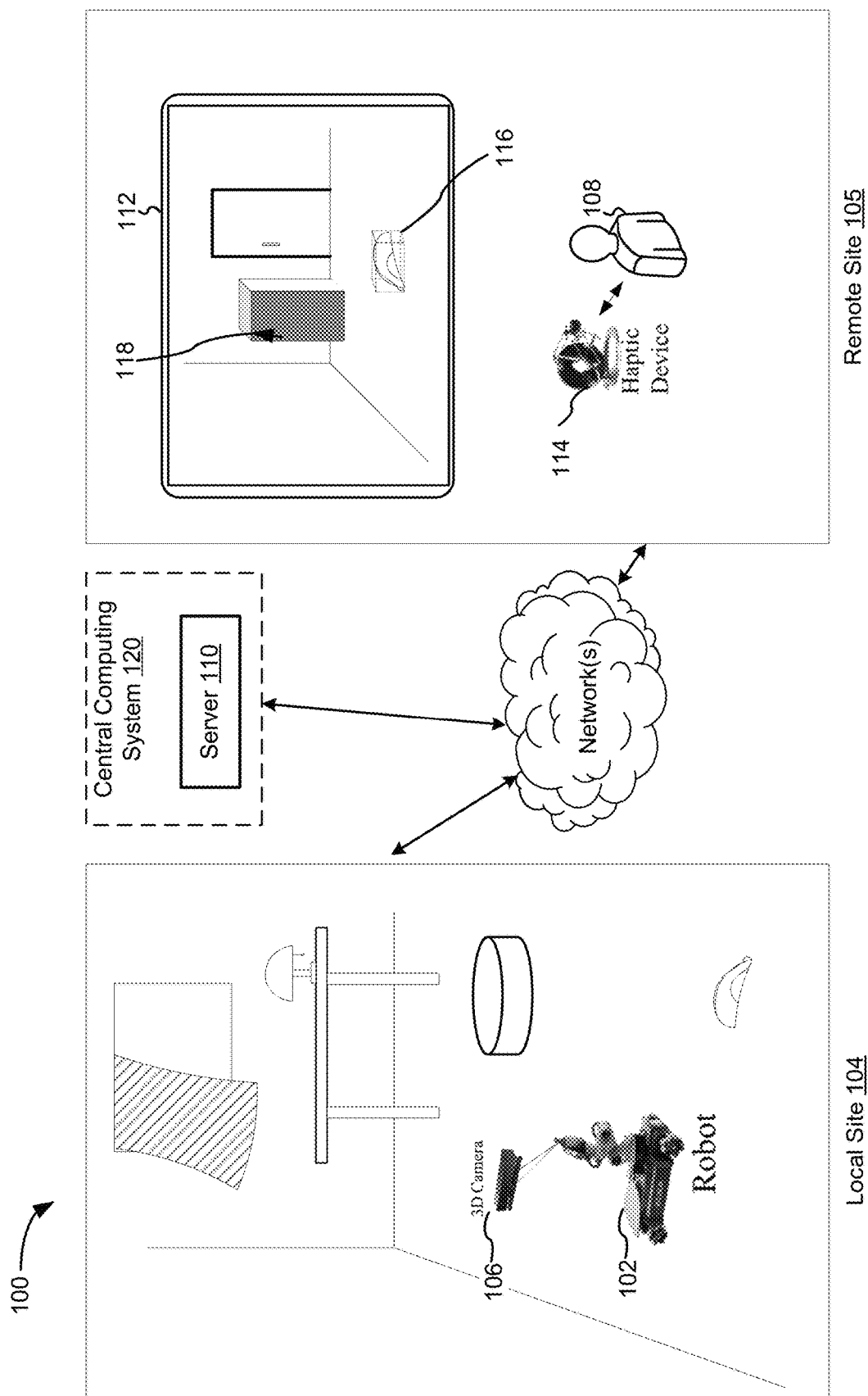
FIG. 1 is an exemplary mixed-initiative robotic control environment in accordance with some implementations.

This disclosure provides system and method for providing mixed-initiative robotic control in accordance with various embodiments.

Mixed-initiative robotic control has advantages over teleoperation and fully autonomous robotic control using preprogrammed instructions due to its flexibility and real-time adaptability to new situations with intermittent aid of a remotely located human operator. On the one hand, the robot is programmed to perform various low level or intermediate level tasks in accordance with environment input collected via on-board sensors and/or through a network, on the other hand, a human user can intervene indirectly at suitable times by modifying the perceived environment input, in accordance with actual real-time visual and haptic rendering of the scene based on streaming RGBD data received from the sensors collocated with robot. The haptic feedback provided to the user via a haptic-enabled input device allows the user to explore, touch, and experience the scene via a haptic cursor or to interact with the scene through simulated physical interactions between a user controlled virtual object and the scene. The flexibility and adaptability of haptic-enabled mixed-initiative remote robotic control allows the system to be used in many situations that are too tedious, strenuous, and/or dangerous for human user and/or situations that are too complex and rapidly changing for fully autonomous robots. In addition, the level of user intervention is adjustable based on an actual situation in real-time, further improving the performance and adaptability of the system.

Below are some example scenarios in which the haptic-enabled mixed-initiative remote robotic control system and method can be utilized with advantage over conventional systems.

In one example, in taking care of patients in field hospitals in remote epidemic disease areas, robots can assist in caring for patients that are highly contagious. Simple tasks such as moving from patient to patient to check their vitals, delivering medication and water to patients at scheduled times, removing soiled linens, cleaning up trash on the floors or bedside tables, etc. Due to the varied conditions in the field hospital rooms, artificial intelligence of autonomous robots based on machine learning and preprogramming may not work very well in such situations (e.g., for lack of training samples similar to the field hospital rooms, and lack of sufficient amount of time for training and perfecting the robot's decision-making programs). At the same time, regular hospital staff and doctors are busy with their regular duties, and may not have the physical stamina and/or undivided attention required to remotely control robots using the teleoperation control mode. In such cases, mixed-initiative remote robotic control with haptic feedback is particularly useful. It relies on the robot's existing programming for low level tasks that are well trained and programmed (e.g., navigating to an identified target along an obstacle-free path, planning and executing a path to avoid obstacles that have been identified in its field of view, and grabbing and putting down an identified target object) and it can also benefit greatly from a human user's help in identifying which objects in the scene is a target, an obstacle, a passage, and/or the best route to approach a target and/or avoid possible obstacles.

In another example, for domestic robots that help with assisting elderly people and managing household chores, the same customized robots can be shipped and delivered to different households, and the preprogrammed operation and navigation instructions may work well for standardized tasks and room layouts, such as sweeping the floor, wiping countertops, taking out trash from the trash can, etc. However, when the rooms are littered after a party, or when the household members randomly leave various types items around the house, or when there are children or pets moving about in and out of the rooms, the limited image processing and decision making capabilities afforded by the standard preprogrammed instructions will not be adequate in properly characterizing and treating these highly varied environment inputs. Furthermore, the same un-customized robots shipped to different houses (e.g., houses with different appearances and layouts, different degrees of organization and cleanliness requirements, and different sensitivity to accidental errors and collisions between the robot and the environment), haptic-enabled mixed-initiative remote robotic control allows a human user to tailor the amount and types of control and intervention provided to the un-customized robot, such that the robot performs customized tasks in its actual customized environment. In some embodiments, the human guidance history is collected overtime, such that the un-customized robot may utilize the history to self-training through machine learning and other artificial intelligence training methods to become more and more autonomous in each household.

In another example, in an industrial manufacturing setting, manual labor is largely replaced by computer-controlled machines and autonomous robots. However, certain tasks remain manually driven, due to the infrequency of the tasks and/or high sensitivities to machine errors and accidents. For infrequent tasks, it is not financially feasible to design and program the robot to specialized in performing those tasks and it is difficult to know when those specially designed robots should be deployed due to the unpredictability of when the needs for each task would arise. Furthermore, with expensive equipment, dangerous chemicals, and/or highly sensitive machinery or measurements in the operating environment, fully autonomous robots are too unreliable to be deployed and utilized without human supervision. In such cases, haptic-enabled mixed-initiative remote robotic control utilizes a human user to provide high-level guidance in real-time and to structure and guide the low-level navigation and operation capabilities of the robot, such that the robot operates with sufficient guidelines and ample margin for machine errors when performing these highly infrequent and/or varied tasks in highly sensitive environments.

There are innumerable example scenarios where haptic-enabled mixed-initiative remote robotic control would outperform conventional teleoperation, or fully autonomous robots, e.g., in terms of design, manufacturing and maintenance cost, ease of programming, flexibility and adaptability, and ease of use. Haptic-feedback provided to the human operator through the haptic-enabled input device when the human operator interacts with the virtualized environment directly (e.g, using a virtual pointer) or through a virtual object allows the user to more accurately assess the physical scene of the robot, and more accurately provides guidance to the robot by changing, marking, or otherwise augmenting its environment inputs.

Individual features or combinations of features of the haptic-enabled mixed initiative remote robotic control system as described herein in various embodiments will further the advantages set forth above and/or provide additional advantages which will be elaborated on in more detail or will be apparent to a person skilled in the art in light the present disclosure.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both user interfaces, but they are not the same user interface.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "remote control" may refer to control over a wired or wireless network, such as the Internet, or an intranet within an organization or household network, the exact distance or location from which the inputs from the human user is provided is not specifically limited, and the scope of the present teachings is not so limited.

It is also to be appreciated that while the terms user, human operator, administrator, technician, person, and the like may be used to refer to the person or persons acting in the context of some particularly situations described herein, these references do not limit the scope of the present teachings with respect to the person or persons who are performing such actions.

FIG. 1 is an exemplary mixed-initiative robotic control environment 100 in accordance with some implementations.

In the environment 100, a robot 102 is located at a first location (e.g., local site 104). The robot 102 or the local site is equipped with a set of sensors 106 for capturing visual and depth data of the local site (e.g., Light Detection and Ranging (LIDAR), or RGBD cameras for capturing RGB colored image data and corresponding depth data of the scene). The visualized area is the region within the field of view of the set of sensors. In some embodiments, the sensors 106 are fixed in location relative to the entire scene. In some embodiments, the sensors 106 are fixed to the robot, and the field of view of the sensors will change when the robot moves within the physical environment of the local site. The robot has onboard processing capabilities to perform low level functions such as moving, grabbing, translating and rotating a grabbed object, and optionally obstacle avoidance during movement. In some embodiments, the robot has onboard processing capabilities to perform intermedia level tasks, such as folding, sweeping, wiping, pressing, opening/closing doors, shaking, stirring, tapping, loading/unloading, etc. sorting, etc. The types of tasks that the robot 102 is designed and preprogrammed to perform independently (without human intervention) are tailored to the particular application scenarios. For example, a domestic robot will be programmed with capabilities to sweep and mop a target area when the target area is clearly identified to the robot, and to pick up trash and send them to trash can when the trash items are clearly identified to the robot and the route to the trash is clear and unblocked by other unidentified objects. The robot 102 and the set of sensors 106 are further equipped with network communication capabilities with sufficient bandwidth to transmit the RBGD data collected at the local site, and to receive control instructions from a remotely located human operator 108 and/or a server 110.

At the local site, various physical objects, physical boundaries, physical surfaces, physical paths, and physical passage ways exist at different locations. The different physical objects, physical surfaces, boundaries, paths, passage ways, may also change in appearance, shape, location, and state. For example, a curtain may be open or closed, or sway in a gust of wind; a door may be opened or closed, a liquid spill may gradually spread on the floor, a patient may change his/her posture, a pet may move around, etc. The physical characteristics of the objects, boundaries, surfaces, paths, and passages include the shape, size, surface texture, weight, friction, flexibility, elasticity, plasticity, response to touch or impact (e.g., breaking, moving, deforming with or without the ability for restoration, or being immobile), etc. The objects may be identified as targets (e.g., a recipient or receptacle of an article that is being delivered, an item that is to be picked up and/or moved, an area that is to be cleaned, etc.), obstacles (e.g., furniture, pet, walls, etc.), things to steer around (e.g., puddles, toys on the floor, wires, sensitive equipment, expensive home decors, etc.), or things that can be run over, pushed away, open or through (e.g., curtains, doors, balls, carpet, etc.) during normal navigation movement of the robot, and/or things that can only withstand certain actions but other actions (e.g., carpeted area can be swept and vacuumed, but not mopped), etc.

At the remote site 105, a display generation component 112, such as a display, a projector, a heads up display or the like, is used to display a virtualized version of the physical environment captured by the set of sensors 106. The image and depth data that are streamed from the set of sensors 106 are used to generate the virtualized version of the physical environment in the form of a point cloud or other three-dimensional representation of the physical environment (e.g., models including representations of virtual surfaces and objects), such that the virtualized version of the physical environment that are visually presented at the remote site 105 via the display generation component 112 corresponds closely to the state of the physical environment at the local site at substantially the same time.

In addition to the display generation component 112, one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands) is utilized by the human operator 108 to provide inputs and instructions that will be utilized in controlling the robot 102. The one or more input devices include a haptic-enabled input device 114 (e.g., a three-dimensional haptic-enabled pointing device, a haptic-enabled glove, etc.) that generates force, motion, and/or texture feedback to the hand(s) of the human operator in accordance with simulated physical characteristics and physical interactions that occurs at a location in the virtualized environment that corresponds to the current movement and position inputs provided via the input device. For example, when the movement and position inputs provided via the input device 114 corresponds to movement along a simulated surface in the virtualized environment corresponding to the floor at the local site 104, the haptic feedback generated on the haptic-enabled input device 114 will elicit haptic sensations in the user's hands that correspond to the friction, texture, and hardness of the physical floor. When the movement and position inputs provided via the input device 114 corresponds to movement to the edge of the floor and up an abutting wall, the force feedback provided on the input device will inform the user of the physical structural relationship between the floor and the wall. When the movement and position inputs provided via the input device 114 corresponds to movement on a gravel path, the haptic feedback generated on the input device 114 will allow the user to get a sense of whether the robot will be able to navigate on the gravel path or topple over due to its unevenness. The real-time haptic feedback in conjunction with the visual rendering of the virtualized environment of the local site allows the human operator to accurately experience and assess the scene, and to provide more accurate and prudent guidance to the robot's navigation and operation. The virtual representation of the physical world combined with the haptic feedback provided during interaction with the scene give rise to a sense of "mixed-reality" because the scene is neither purely "virtual" in the conventional "virtual reality" sense (e.g., as it closely reflects the physical characteristics of the physical environment (e.g., in terms of geometry and material properties)) nor "reality" in the conventional "augmented reality" sense (e.g., as it is not a visual image of the physical environment, but rather a computed representation that combines RGB image data and corresponding depth data).

In some embodiments, the input devices at the remote site optionally supports teleoperation as well, and the human operation can temporarily switch to the teleoperation mode at any time for particular difficult or complex tasks. At other times, the human operator allows the robot to operate fully autonomously by not providing any guidance inputs or alteration to the virtualized environment inputs processed by the robot's program logic.

In some embodiments, the human operator 108 uses the haptic-enabled input device 114 to interact with virtualized surfaces and/or objects in the virtualized environment, and receive corresponding haptic feedback. Based on the haptic feedback, the user can select a location in the virtualized environment as the starting location for object segmentation. The segmentation with the aid of the user input is more accurate and less error prone. In some embodiments, some visual features in the virtualized environment are artifacts of lighting and shadows, and/or decorative patterns on surfaces. These are easily distracting to a purely computer-based object segmentation method with no real-time human assistance, leading to inaccurate results. With the aid of real-time human guidance, the three-dimensional object segmentation is less likely to be side-tracked by these visual distractions, as object segmentation is anchored around the point of interest identified by the human operator and assisted with corresponding depth data.

In some embodiments, the human operator 108 uses the haptic-enabled input device to insert one or more virtual objects (e.g., virtual object 116) into the virtualized environment. The human operation may interact with the virtualized environment through manipulation of the virtual objects in the virtualized environment, such as moving a virtual object along a surface and/or pushing a virtual object against another surface or object in the virtualized environment. A virtual object may be given specific shape, size, and surface characteristics that result in different simulated haptic feedback to the human operator on the haptic-enabled input device 114, when the virtual object is moved along or pushed against surfaces or objects (virtualized physical objects and virtual objects) in the virtualized environment. The haptic feedback is generated based on physics simulation in accordance with the physical characteristics of the virtualized environment at locations of the interactions.

In some embodiments, the virtual objects can take on different types of roles that change the virtualized environment in different ways to influence the navigation and operation decisions of the robot in different ways. In some embodiments, a first type of virtual objects can serve as a protective shield over a virtualized physical object that is either stationary or mobile in the scene. For example, a protective dome is placed at the location of a small child or pet and moves with the child or pet in the virtualized environment. In some embodiments, a second type of virtual objects can serve as a passage indicator that overrides the presence of a physical object that is normally treated as an obstacle or barrier by the robot. For example, the robot will treat the drapery blocking a door way as an obstacle, and placing a virtual object that is a passage at the location of the drapery allows the robot to ignore the presence of the drapery and push through the drapery in navigation. In some embodiments, a third type of virtual objects can serve as a measuring aid for measuring the virtualized physical objects in the virtualized environment and/or provide more accurate route guidance. For example, the user can place down a first anchor point of a virtual object at a first corner where the floor meets two adjacent walls (e.g., the user will know where the corner is by touching the scene via the haptic enabled input device 114 and receiving the haptic feedback), and then extend the virtual object along the edge between the floor and one of the walls until reaching the other corner. The size of the virtual object will inform the user of the dimension of the room along the wall. In another example, the user needs to determine whether there is enough room between two physical objects in the scene for the robot to pass through with enough safety clearance. As it is difficult to accurately make this determination visually, the user can place a virtual object that has dimensions of the robot plus the added clearance, and the user can try dragging the virtual object through the gap between the two physical objects in the virtualized environment, the physics simulation of this interaction will produce haptic feedback to the user via the haptic-enabled input device that the virtual object is or is not blocked by the two objects in the scene. The user can determine an alternative route or plan other tasks (e.g., request the robot to moving one of the objects first) based on the haptic feedback. In another example, if a one-meter gap is needed between the hot oven and the robot, the user can place a 1×1 $m^2$ virtual cube in the scene (on the floor near the oven) and then push the virtual cube until it is pushed against the virtualized oven (e.g., the user will feel the resistance of the virtual cube when the virtual cube has come into contact with the virtualized oven in the scene), and virtual cube will serve as the virtual wall between the oven and the robot when the robot plans its route). In some embodiments, a fourth type of virtual objects may be a series of waypoints that the robot should reach before reaching a selected target (e.g., a designated virtual object or virtualized physical object in the scene). As the user moves a pointer object 118 along one or more virtualized surfaces in the scene and experiencing simulated haptic feedback via the haptic-enabled input device 114, the user can choose to mark one or more points along the movement path, as guidance for the robot 102 to follow. The route guidance provided with the haptic-feedback generated in accordance with actual physical characteristics (e.g., structure, size, texture, etc.) of the environment is more accurate and less difficult for the robot to execute in most cases. For example, the user will follow the path of least resistance when dragging his/her finger or hand toward a target object in the scene, and the path will be followed easily by the robot. In other types of interfaces where such haptic feedback is not available, the user may have to draw lines based on visual information alone, and does not take into account the surface texture, slope, etc. of the path.

In addition to the equipment collocated with the robot 102 and the equipment collocated with the human operator 108, the haptic-enabled mixed initiative robotic control system includes a central computing device 120 (e.g., the server 110) that handles the extensive computation tasks related to visual and haptic data processing and rendering, and generating intermediate instructions and workflows that bridge the gap between the high-level instructions and environment inputs received from the human operator 108 and the low-level instructions executable by the robot 102. The central computing device 120 is connected to the local site equipment and/or the remote site equipment via one or more networks. In some embodiments, the central computing device 120 is collocated with the robot 102 (e.g., in an industrial manufacturing application setting, the human operator is remotely located from the robot and the factory server). In some embodiments, the central computing device 120 is collocated with the human operator 108 (e.g., in a field hospital application setting, the robot is remotely located from the doctor and the hospital server). In some embodiments, the central computing device 120 is not collocated with either the robot 102 or the human operator 108 (e.g., in a domestic assistance setting, the server is remotely located from the robot and the human operator).

In some embodiments, the central computing device 120 handles the computation related to real-time, simultaneous localization and mapping (SLAM) using real-time dense surface mapping and tracking techniques, such as KinectFusion. In some embodiments, other real-time three-dimensional modeling methods are used to generate a virtualized three-dimensional or pseudo-three-dimensional representation of the physical environment based on the streaming image and depth data collected from the local site 104. The central computing device 120 generates a point cloud during every time step of the streaming RGBD data using KinectFusion for visual rendering. In some embodiments, real-time, user-directed object segmentation is incorporated into the KinectFusion data processing pipeline, as needed. The central computing device 120 also performs haptic render and physics simulation for interactions between the user 108 and the virtualized environment, e.g., via a virtual pointer or via manipulation of a virtual object inside the virtualized environment. In some embodiments, the virtualized environment is represented by a three-dimensional point cloud. In some embodiments, the virtualized environment is represented by a three-dimensional mesh that includes simulated surfaces that correspond to physical surfaces detected in the physical environment.

In some embodiments, the central computing device 120 includes a path planner that generates a path based on the user's marking or virtual objects inserted by the user. The path planner takes into account both the characteristics of the virtualized physical environment and the user's modification and/or augmentation to the virtualized physical environment, and generates the path in accordance with preprogrammed path planning instructions. In some embodiments, the path planner is implemented on the robot. In some embodiments, the path planner generates predicted positions and commands for the robot to follow.

Figure 2:
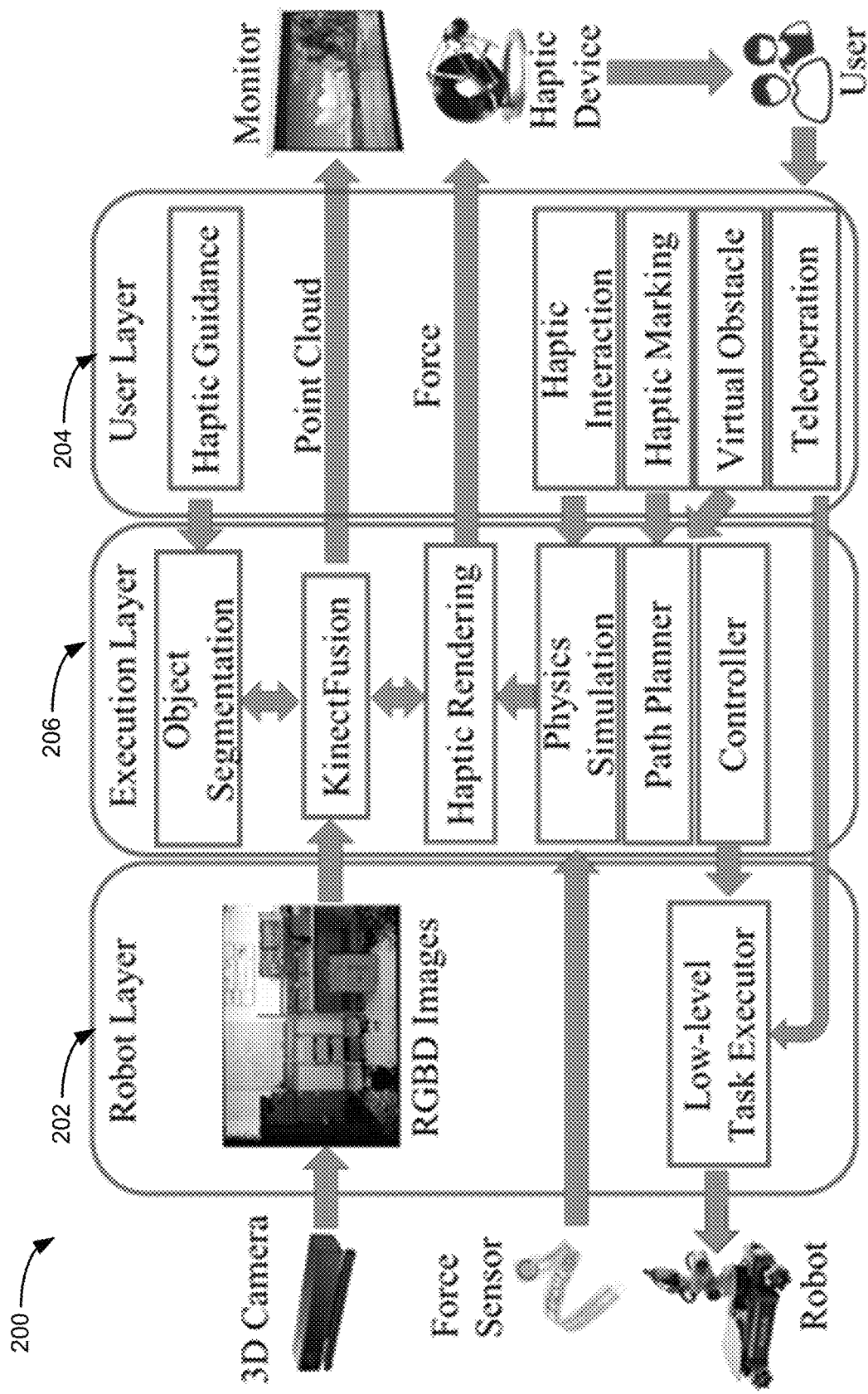
FIG. 2 is a block diagram illustrating an exemplary architecture that includes the mixed-initiative robotic control environment in accordance with some implementations.

FIG. 2 is a block diagram illustrating an exemplary architecture 200 that includes the mixed-initiative robotic control environment in accordance with some implementations.

As described herein, reconstruction of a representation of the three-dimensional physical space in which the robot is operating needs to be performed in real-time with fair degree of accuracy in order for the user to provide appropriate and timely intervention. In order to facilitate real-time three-dimensional exploration, segmentation, marking, and interactions with the environment, haptic-rendering and physics simulation need to be performed in real-time in conjunction with the visualization of the environment. Since the visual and depth data that needs to be transmitted and processed is voluminous in nature, network latency needs to be managed in order to provide smooth, real-time operation and control based on such data communicated over networks with various latencies.

To address the above technical requirements, a real-time efficient and robust mixed reality platform for mixed-initiative control is proposed to enable haptic interactions with streaming data. A Truncated Signed Distance Function (TSDF)-based haptic rendering method with streaming surfaces is proposed to ensure the smooth and robust haptic interaction with virtualized static scenes. An interactive object segmentation method is proposed to segment objects quickly and accurately. Different types of haptic interactions are introduced in the mixed reality platform, and a robot state prediction method is proposed to compensate network delays.

In some embodiments, Fusion-based methods (e.g., KinectFusion) are used to perform localization and mapping of streaming visual and depth data. According to KinctFusion, the streaming RGBD data from the three-dimensional camera are fused and saves as a Truncated Signed Distance Function (TSDF). KinectFusion can provide the full-scene dense geometry to enable mixed reality. The present disclosure describes visual and haptic rendering with streaming surfaces generated by KinectFusion using an improved haptic rendering pipeline including collision detection, proxy update and force computation. This improved method is computationally efficient and integrate well with the KinectFusion framework. The improved method also works well for intersecting boundary of two or more planes, ameliorating the instability of previously disclosed methods for such calculations. This is especially significant when working with real-world scenes which include complex geometry with many intersecting boundaries. When performing object segmentation, the improved method allows user interaction with the reconstructed object surface in the scene, and performs segmentation in real-time, rather than through offline semantic classifications. In the present disclosure, haptic interaction is used to select a target object, an interactive region growing method is used for object segmentation using both a color image and a depth image, and a resulting labeled image is fused into the TSDF data structure.

As shown in the FIG. 2, an exemplary mixed reality system architecture 200 comprises three layers: a robot layer 202, a user layer 204, and an execution layer 206.

In some embodiments, the robot layer 202 corresponds to a mobile robot (e.g., robot 102) and a set of RGBD 3D sensors (e.g., 3D camera 106) placed on the top of the robot. This layer is responsible for collecting the color and depth images in real-time, and sending the data to the execution layer 206 for scene reconstruction, and visual and haptic rendering. A low-level task executor in this layer execute the control commands that are sent by the controller in the execution layer 206 to perform navigation and object manipulation tasks.

In some embodiments, the execution layer 206 receives the RGBD images (e.g., streamed from the RGBD sensors on top of the robot 102 over a network) and performs simultaneous localization and mapping (SLAM) using a KinectFusion module. The KinectFusion module generates a point cloud every time step for visual rendering on a display monitor. The execution layer 206 combines an object segmentation module with the KinectFusion module to segment and mark an object in the scene as required by the user. The execution layer 206 also includes a separate thread for haptic rendering that is performed in parallel with the visual rendering (e.g., generation of the point cloud). A physics simulation module handles the situation that the haptic interaction interface is used to interact with a virtual object in the scene and/or to interact with the scene through manipulation of a virtual object in the scene. The haptic rendering and physics simulation produces haptic feedback data that controls the haptic-enabled input device (e.g., input device 114) held by the user (e.g., user 108). The haptic feedback includes position, motion, force (e.g., reactive force such as resistance to pressure and impact, and frictions), texture, vibrations, etc., output to the user's hand via the haptic-enabled input device (e.g., input device 114). In some embodiments, the execution layer 206 includes a path planner that generates a path based on the user's marking inputs and/or the virtual objects placed within the scene, in addition to the characteristics of the virtualized environment deduced from the image and depth data (e.g., as represented by the TSDF or point cloud). In some embodiments, the execution layer 206 includes a controller module that is used to generate a predicted position and commands for the robot to follow. In some embodiments, the path planner and the controller are optionally implemented in the robot layer 202 and receives the user input data and the environment data from the execution layer 206. In some embodiments, the execution layer 206 is implemented on the central computing system 120 (e.g., a server 110).

In some embodiments, the user layer 204 provides all the interaction interfaces and outputs to the user (e.g., user 108). The user can either use a teleoperation interface to directly operate the robot (e.g., directly providing low level commands and instructions), or use the haptic interfaces to interact with the virtualized three-dimensional environment. In some embodiments, a haptic guided object segmentation interface is provided to the user and is only used for segmentation. The haptic interaction interface enables the user to use haptic input to experience and realize placement and movement of virtual objects in the scene, and assigning various types of roles to the virtual objects (e.g., target, passage, obstacle, shield, guide, measure, etc.). Haptic marking is used to either define a path on a surface in the scene or mark one or more waypoints (e.g., virtual object and/or virtualized physical object) for the robot to follow, approach, and/or track. In some embodiments, the marking and movement of the virtual object is processed in real-time in the virtualized scene and followed by the robot in real-time in the physical scene. The virtual obstacle interface enables the user to add virtual objects of any form of geometries into the scene, then the path planner will search a new path in accordance with the positions and the assigned roles of the virtual objects, in conjunction with the characteristics of the scene. In addition to haptic feedback, the visual rendering also reflects the interactions with the scene by the user, either directly through a virtual pointer or indirectly through interaction with a virtual object in the scene.

FIG. 3 illustrates an exemplary processing pipeline 300 for real-time visual and haptic rendering at the remote site of the mixed-initiative robotic control environment, in accordance with some implementations.

As shown in FIG. 3, RGBD data 302 received from the sensors (e.g., camera 106) collocated with the robot (e.g., robot 102) is streamed over a network and provided to a graphical processing unit 302 (GPU) on a central computing system 120 (e.g., server 110). Since KinectFusion is applied for dense mapping and localization, dense geometry is generated as the streaming surfaces of the 3D virtualized environment. In the GPU 302, TSDF update is performed, followed by collision detection, and followed by proxy update with force shading and ray casting. The resulting data includes a point cloud 306 and proxy values 308 for all haptic interaction points (HIPs). The point cloud 306 and the proxy values 308 are utilized in visual rendering on a display (e.g., display 112), and the proxy values 308 are utilized in force rendering on the haptic-enabled input device (e.g., input device 114).

In the present disclosure, a novel proxy update method with force shading is proposed, which is more efficient and guarantees the stable rendering at intersecting boundaries of different planes. Furthermore, the method allows addition of surface properties such as friction and haptic textures in haptic rendering.

Proxy update is a key-part of constraint-based haptic rendering, since the proxy is not only used to compute the force at an interaction point, but also rendered visually to the viewers. If the proxy update is not stable and smooth, the force rendering and visual rendering will not be smooth. Previously, a proxy update method that has been published uses gradient-based method to find the nearest surface point. As shown in FIG. 4, FIG. 4(1) on the left shows a scenario that the haptic interaction occurs on a surface with a sharp change in direction (e.g., interaction goes around a corner of a curved surface or the boundary of two intersecting planes). In this scenario, the haptic interaction point (HIP) is moved by the user from $h_{i-1}$ to $h_i$, and the proxy position is changed from $p_{i-1}$ to $p_i$, in accordance with previously disclosed haptic rendering methods. Since the proxy is always the nearest surface point according to the HIP in the previously disclosed method, the proxy undergoes a sudden change in position. In terms of user experience, it would feel as though the user's finger has suddenly "jumps" to the other side of the surface, and computed force is changed drastically to an almost reversed direction. This feels distracting, unrealistic, and confusing to the user.

Force shading is an algorithm for smooth haptic rendering. In this disclosure, a novel TSDF-based proxy update method with force shading is proposed. Different from previous force shading methods, the presently disclosed method focus on the TSDF data structure, which can be used in all of the fusion-based 3D reconstructions. Two scenarios are handled in the improved proxy updating method:

a. If the HIP is the first contact with the surface in an interaction, the proxy is to find the nearest surface point. Instead of the gradient-based iterative method proposed in previously disclosed methods, the task of finding the nearest surface point is integrated into the ray casting step in KinectFusion. The reason for this change is that the deformable property for the surface is not considered, and therefore the ray casting is performed after the haptic rendering. Per-pixel ray marches in TSDF to generate the point cloud for the whole surface. During this procedure, the distances between the HIP and every point on the surface are computed and saved. The nearest surface point finding problem now becomes a parallel problem that finds the minimum in the distance array. This problem can be solved through parallel reduction as disclosed in "SC07, High Performance Computing with CUDA (2007) by Mark Harris." In some embodiments, nearest surface point finding in ray casting require the following: Given a starting point h: 1. Parallelized thread: each pixel's corresponding ray; 2. Marches from minimum depth, stop when zero crossing to get surface points; 3. Compute the distance d=|s-h|; 4. Parallel reduction to get minimum distance, and return the corresponding surface point as the nearest point.

b. After the HIP penetrates into the surface, the subsequent proxy position needs to be updated since the HIP will penetrate further into the volume. As shown in FIG. 4, the nearest surface point is not appropriate for this scenario, a more correct way is to constrain the succeeding proxy. In the presently disclosed method, the previous time step normal $n_{i-1}$ is used to define a tangent plane (as shown in FIG. 4(2)), the normal of the proxy will be computed every time step. Tracking this normal is like tracking a tangent gliding plane over the surface physically. As shown in FIG. 4(2), the tangent plane $T_{i-1}$ is "dragged" by the new proxy position $h_i$ while attached on the surface. So, the tangent plane can be treated as a constraint plane for the proxy. First, a perpendicular is dropped from $h_1$ to this constraint plane to get a goal position $g_i$, which is the first approximation of the proxy. Then, the nearest surface finding in the ray casting step (see description in section a above) will be used to find the new proxy $p_i$. The core of this method is to use the tangent plane to constraint the new proxy in a physically plausible way, then to refine it as the nearest surface point. In some embodiments, the whole procedure for subsequent proxy update with force shading includes: 1. Based on the normal $n_{i-1}$, get the tangent plane $T_{i-1}$; 2. Drop a perpendicular from the current HIP $h_i$ to $T_{i-1}$ to get $g_i$, and 3. Use the nearest surface point finding in ray casting algorithm described above, with $g_i$ being used as the first point, to compute the final proxy $p_i$.

In some embodiments, the improved method described herein simulate surface properties to generate simulated friction forces, and different haptic sensations of textured surfaces. In some embodiments, the friction force can be simulated by a simple change using a known friction cone. The angle a defines a cone starting from the current HIP $h_i$, as shown in FIG. 5. The friction cone forms an interaction circle with the tangent plane from the previous proxy point $p_{i-1}$. In some embodiments, $\beta=\arctan(\mu)$, where $\mu$ is a user defined friction coefficient. If the previous time step proxy $p_{i-1}$ is inside the interaction circle (e.g., as shown in FIG. 5(1)), then the new proxy will be directly set to the same value as before: $p_i=p_{i-1}$. If the previous time step proxy $p_{i-1}$ is outside of the interaction circle (e.g., as shown in FIG. 5(2)), then the goal position (approximated proxy) $g_i=c_i$, where $c_i$ is the point closest to $p_{i-1}$ on the interaction circle. These two scenarios correspond to simulated static friction and simulated dynamic friction. In some embodiments, the haptic texture is implemented by using a bump texture method which can generate the constraint for each point on the surface to change the normal.

In some embodiments, an interaction region growing 2D segmentation method is used to perform object segmentation with haptic-enabled user guidance. To segment a three-dimensional object from the reconstructed three-dimensional scene, a haptic-enabled segmentation interface is provided. Such an interface enables more flexible haptic interaction, e.g. haptic texture, material properties for different objects, and also provides the object position and orientation for robot grasping tasks. Many previous researches combine object detection and semantic classification into dense mapping. The presently disclosed system aims to build haptic-enabled interfaces for the mixed-initiative control, therefore the high-level semantic segmentation is not required. The presently disclosed interactive 3D object segmentation method is not only efficient, but also compatible with the popular high-level object semantic algorithms as the input.

In some cases, the straightforward way to perform object segmentation is to segment the 3D object from the 3D point cloud. It is also possible to use the KD-tree to speed up the neighbor search for points. However, these conventional methods take extra processing time. An alternative way is to perform the segmentation based on TSDF data, and save the segmentation information into the TSDF.

In the presently proposed KinectFusion pipeline (as shown in FIG. 3), the depth image is fused for surface reconstruction at each time step. Thus, a two-phase algorithm as follows may be proposed, as shown in FIG. 6. In the first phase, 2D segmentation is performed from both the depth image and color image. After the 2D segmentation, a label image $L_i$ is generated. In the second phase, the segmentation is fused into the TSDF together with the depth image (e.g., in the TSDF update step in FIG. 3). In this way, the segmentation is seamlessly integrated into the KinectFusion processing and reduces the overall computation time cost. Moreover, the segmentation information will be fused by weight, which generates a robust segmentation result.

In some embodiments, during the first phase of the improved method, the user uses the haptic avatar (e.g., a virtual pointer) to "touch" and mark an object of interest in the 3D scene. Then the 3D mark (e.g., with its 3D coordinates) is transformed into coordinates in the current color image. In the next time step, starting from the marked point in the image, the pixels are clustered through a region growing method until there are no pixels to be added to the region of the marked point. The region is treated as a cluster, then the distances between a neighbor pixel and the cluster center is computed as the combination of two Euclidean distances as shown Equation 1 below:

$$d(x_i, S) = \|I(x_i) - I(S)\|_2 + \beta \|P(x_i) - P(S)\|_2 \quad (1)$$

where $x_i$ is the neighbor pixel's position, and S is the center of the region. I is the CIELAB color space value of the pixel in the color image, which is widely considered as perceptually uniform for small color distances. P is the 3D coordinates which are computed from the depth image. The values for cluster center: I(S) and P(S) are computed as the averages of the values of all pixels in this cluster. $\beta = m/g$ is a parameter that controls the compactness of a cluster. m is the variable to control the compactness, g is the grid interval. The region growing with RGBD data provides better boundary of objects that only with RGB data. The greater the value of m, the more spatial proximity is emphasized and the more compact the cluster. This value can be in the range [1, 20], e.g., a value of 10 is commonly used. The distance threshold can be chosen by the user based on characteristics of the scene and/or the object of interest in the scene at the time of segmentation.

Figure 7A:
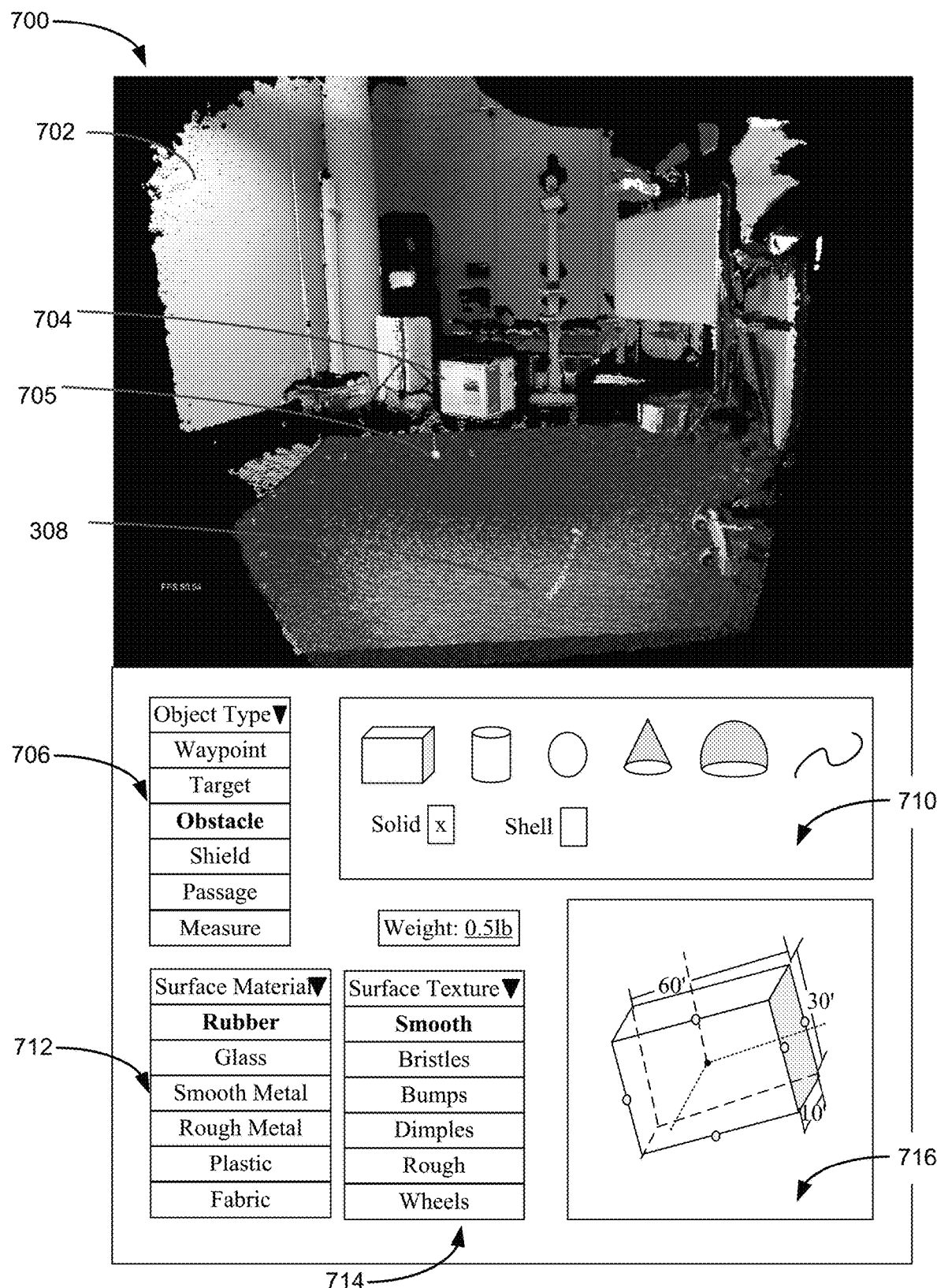
FIGS. 7A-7C illustrate various examples of haptic markings and virtual objects to influence route planning and operation of the robot, in accordance with some embodiments.
Figure 7B:
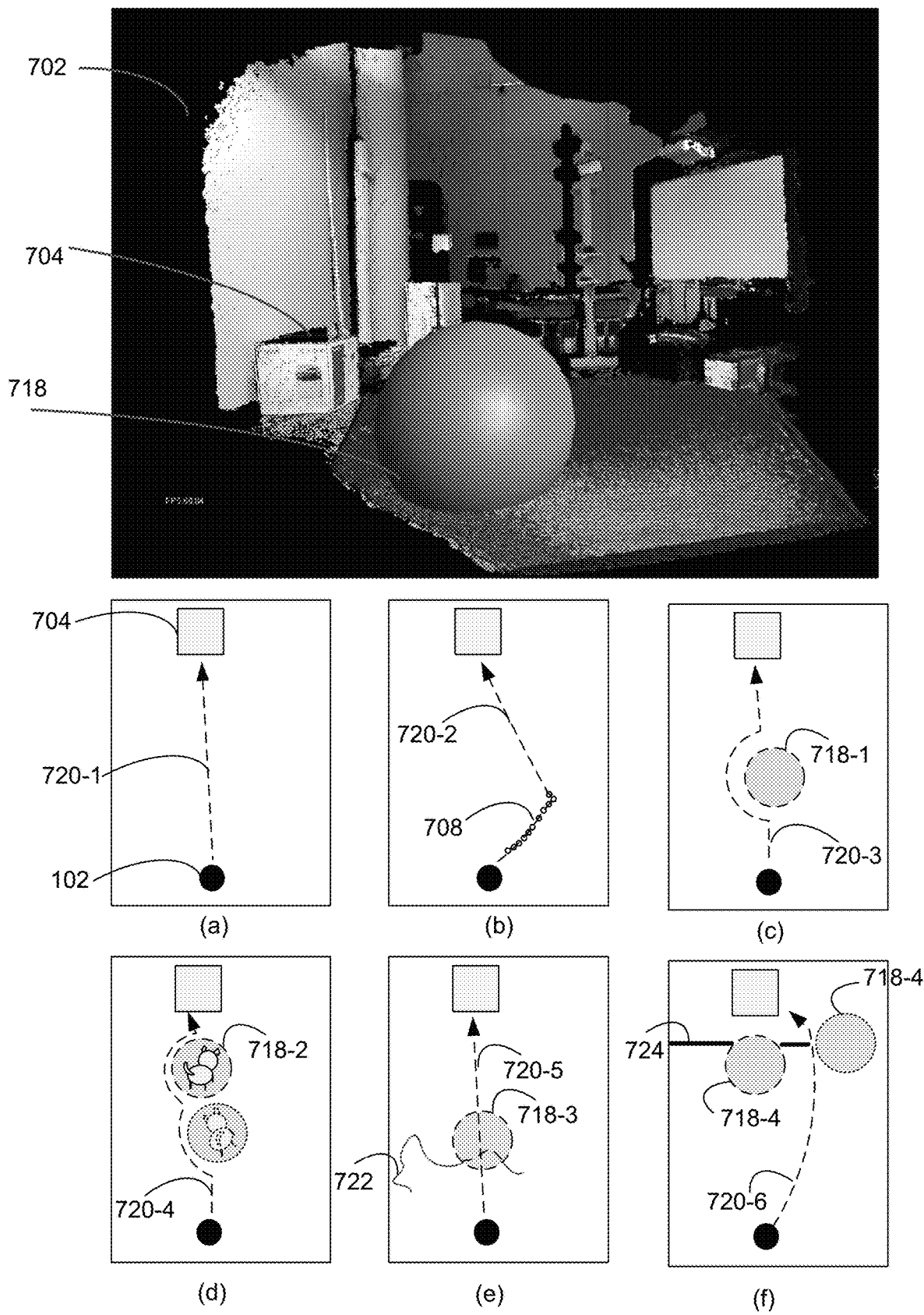
Figure 7C:
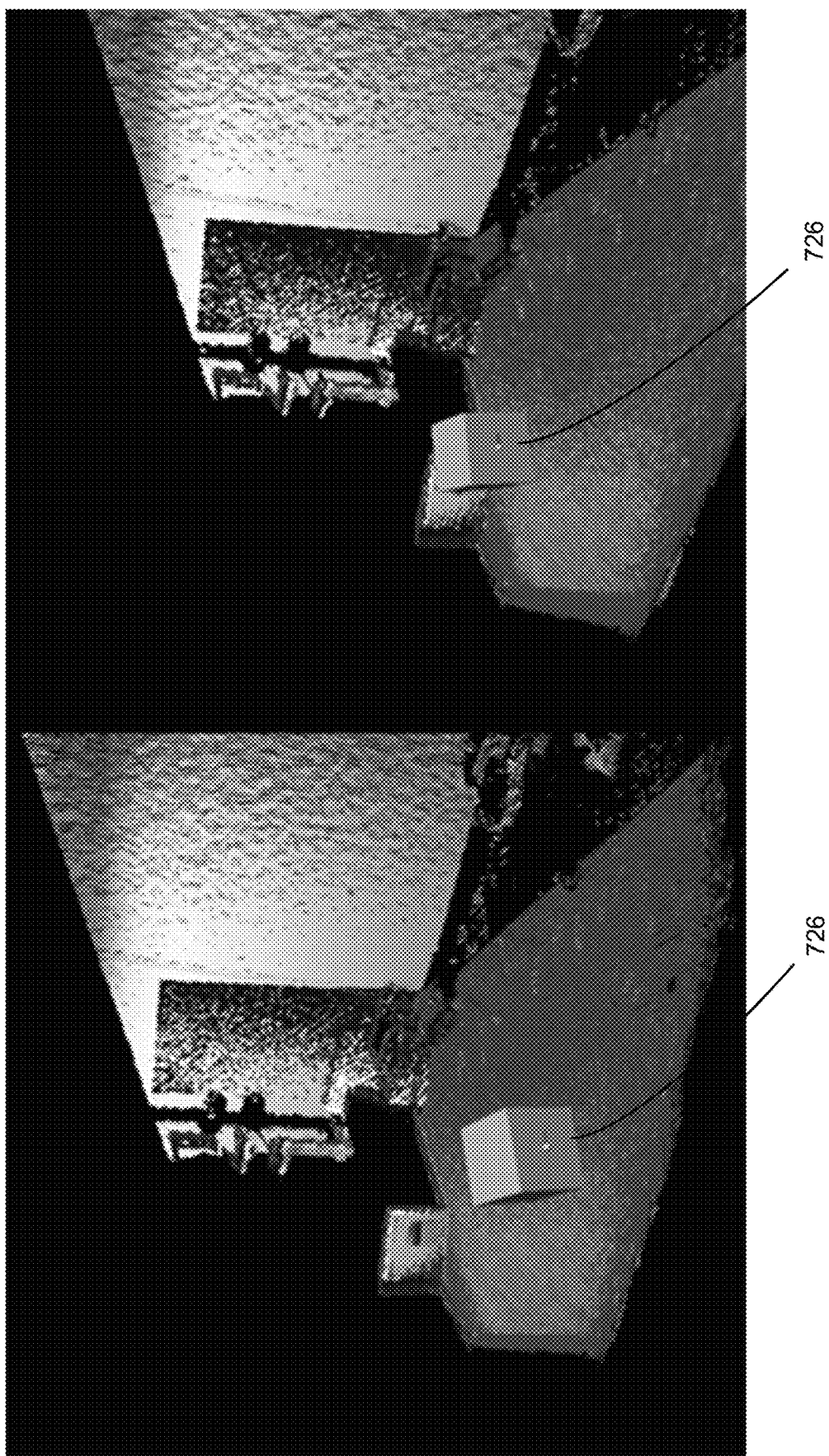

FIGS. 7A-7C illustrate various examples of using haptic markings and virtual objects to influence route planning, in accordance with some embodiments.

In most previous works, haptic force feedback is used to generate path guidance forces, collision preventing forces, or environmental force to improve the performance of high-level tasks operations. However, the presently disclosed system uses a haptic device in a different way. A haptic device is used as the 3D avatar to remotely touch, explore and interact with the virtualized real-world environment. The haptic interaction provides more flexible operations similar to using "virtual hands". The haptic interfaces can intervene the robot control procedure, and add a new path or change destinations. These interfaces will not influence the velocity of the robot, but only the paths and target points.

In some embodiments, a haptic marking interface (e.g., user interface 700) is provided for providing path guidance to the robot, since haptic rendering for surfaces in the scene is performed in real-time and is computationally efficient. Through the haptic marking interface, a user can use an HIP to touch a surface (e.g., a floor) in the scene to mark a path for the robot to follow. Then, the control manager in the execution layer takes this marked path as input to invoke the path planning. In some embodiments, the marking is saved as an ordering point set, and saved separately in the remote server. In some embodiments, the guidance is provided as an option to the path planner, for the path planner to consider in light of other options available in the scene. In some embodiments, when multiple options are available to the path planner, the user's marking is given more weight or dominant weight relative to other options available to the path planner. In this manner, the preprogrammed path planning instructions can be used normally, with or without user intervention, and the robot control can slide between fully autonomous to teleoperation, or anywhere in between, at any time, thereby improving the flexibility and effectiveness of the robotic control.

In some embodiments, the presently disclosed system provides a haptic marking interface (e.g., user interface 700) that further allows the user to add one or more virtual objects to the 3D virtualized scene to indirectly influence path and/or operations of the robot, in accordance with some embodiments. It is much easier to use the haptic-enabled device to place a virtual object at a desired location in the scene because of the haptic feedback that conveys the absolute physical characteristics of the scene at different locations (e.g., dimensions, texture, slope, etc.), and the characteristics relative to a virtual object or the robot. This enables the user to locate a suitable 3D position for the virtual object quickly and accurately, or to guide the user's the placement of the markings that are used to provide path guidance to the robot.

As shown in FIG. 7A, the example haptic marking interface 700 includes a visual rendering region 702 that displays the virtual representation of the physical environment in front of the robot. The virtualized physical environment represented in the visual rendering region 702 is optionally a point cloud that is dynamically updated in real-time with the streaming image and depth data received from the sensors collocated with the robot. In some embodiments, the points displayed in the visual rendering region 702 have been segmented (e.g., using the user-assisted region growth method disclosed herein), and surfaces and boundaries associated with physical objects in the point cloud have been labeled and visually represented as such. For example, the floor is segmented from a user-specified point 805, after the user has explored the floor region in the image using the haptic enabled input device.

As shown in FIG. 7A, a cubic box has been segmented out of the point cloud, and an outline 704 of the box is shown around the box. The user has marked the box as a target for the robot's next task, by selecting the outline 704 and selecting an object type of "target" for the outline. For example, by invoking a contextual menu while the box is selected, and selecting the "target" object type from the contextual menu. When moving the virtual pointer 705 on the surface of the box using a haptic-enabled input device, the haptic feedback provided on the haptic-enabled input devices convey the geometry of the box (e.g., turning around the intersection of abutting planes of the box).

As shown in FIG. 7A, the user has also placed a series of waypoints 708 on the surface of the floor shown in the visual rendering region 702. For example, the user can select the object type "waypoint" from the object type selection region 706 (e.g., a drop-down menu of various virtual object types, including waypoint, target, obstacle, shield, passage, measure, etc.). Then, the user can move the virtual pointer along the floor surface and selectively putting down a series of waypoints along a movement path of the virtual pointer. The haptic feedback provided on the haptic-enabled input devices convey the friction and surface geometry of the floor along the movement path of the virtual pointer, and also constrain the movement path of pointer (e.g., the pointer cannot go through the floor, and the smoothness and speed of the pointer movement is constrained by the roughness of the floor).

In an example, the proposed system provides a haptic-enabled interface (700) from which the user can select or specify one or more virtual objects (e.g., virtual objects with preset dimensions or shapes, such as spheres, domes, cubes, cones, lines, walls, tables, chairs, etc., of different sizes) that user can drag into the 3D rendering of the virtualized scene (e.g., visual rendering region 702). In some embodiments, a virtual object with the shape and size and/or other physical characteristics of the robot is also available in the interface for the user to drag into the 3D scene. In some embodiments, the user can select the virtual object and resize it within the scene by setting an anchor point on one side of the virtual object and drag another anchor point on another side of the virtual object within the 3D scene to resize it.

As shown in FIG. 7A, the user can select an object type of a virtual object from the object type selection region 706. The user can also select an object shape from the object shape selection region 710. The object shape selection region displays a listing of various shapes, and an option for the user to draw a customized shape. In some embodiments, the object shape selection region includes affordances (e.g., check boxes) for specifying whether the specified shape is a solid shape or a hollow shell.

As shown in FIG. 7A, a user can also specify the surface material and surface texture of the virtual object in surface material selection region 712 and surface texture selection region 714. The surface material and surface texture information is used when generating the force feedback provided to the haptic enabled input device, when the user interacts with the virtual object or when the user interacts with the environment through manipulation of the virtual object. In some embodiments, the user can also specify a weight (e.g., a mass) for the virtual object that affects the haptic rendering involving the virtual object. In some embodiments, a virtual object may be a composite object with different portions corresponding to different shapes, materials, textures, and/or weights, respectively.

In some embodiments, as shown in FIG. 7A, the user interface 700 also includes a staging region 716. The user can drag a default shape into the staging region 716 and adjust the dimensions and orientation of the shape. The user can also compose a composite object by dragging multiple object shapes into the staging region and adjust the relative size, location, and orientation of the shapes. Once the user is satisfied with the size, shape, and orientation of the object in the staging region 716, the user can drag and drop it into the visual rendering region 702 (e.g., onto the floor in the scene).

In some embodiments, after the user has selected a virtual object to place into the 3D scene, the user may explore the 3D scene via the haptic-enabled input device before dropping the virtual object into the scene at a specific location in the scene. For example, after the user has selected to drop a dome into the scene, an outline of the dome is shown in the 3D scene around the user's 3D avatar (e.g., virtual pointer) in the scene. The user can drag the 3D avatar around various surfaces in the scene, to experience the slope, texture, dimensions of the scene via the haptic-enabled input device. When a user has identified a suitable location, the user can provide an input to drop the virtual dome at that location. As shown in FIG. 7B, a virtual dome 718 has been dropped into the virtualized environment shown in visual rendering region 702 of the user interface 700.

In some embodiments, if the user has moved into a region that cannot accommodate the virtual dome (e.g., the space is too narrow for the dimension of the virtual dome), or if the location is already occupied by a physical object that is too large to be placed under the virtual dome, a warning feedback (e.g., visual alert) is provided to the user visually on the visual rendering of the 3D scene, and/or through haptics on haptic-enabled input device. In some embodiments, different types of virtual objects are associated with different types of restrictions on what types of space or physical characteristics of space are compatible with the placement of the virtual object. For example, a solid object can only be placed within an empty space that is larger than the solid object's dimensions; while a shell object can be placed within an empty space that is larger than the shell object's dimensions, or a space that is occupied by a physical object that is smaller than the inner dimensions of the shell object. Also, the orientation of the virtual object is adjustable by the user before it is placed into the scene. For example, when a user tries to drag a virtual couch through a doorway in the 3D scene, the virtual couch will be blocked until the user rotates the virtual couch to its side. This is useful when the user wants to determine the robot can actually make a real couch of the same dimensions go through the doorway if provided with correct instructions (e.g., rotation first before pushing).

In some embodiments, physics simulation may be performed in addition to haptic rendering at the location of the virtual object. The user may drag a virtual robot up an incline in the 3D scene and experience the slope of the surface, and the surface friction, and optionally, some representation of the weight of the robot (e.g., visual indication of the robot's power usage for driving up the incline). When the virtual robot is set down on the surface, the physics simulation may show the robot staying in place, or slide down the incline, or topple over depending on how steep the incline is.

In some embodiments, when the virtual object is placed on a simulated physical surface in the 3D scene that corresponds to a physical surface in the real-world, the ground plane is located and saved at the first several time steps. The virtual object can be assigned one or more roles, such as obstacle, shield, wall, target, passage, safety cushion, etc. The path planner will regenerate the new path to accommodate the changes to the virtualized scene with the addition of the virtual object. For example, an insertion of an obstacle type virtual object may cause the path planner to bend an original path for the robot to go around the obstacle. An insertion of a shield type virtual object that is placed over a physical object moves with the physical object in the 3D scene, and the path planner ensures that the robot is always outside of the shield. An insertion of a wall means that the path planner will allow the robot to be on either side of the wall, but cannot move across the wall. An insertion of a target type virtual object causes the path planner to modify a path to approach the target virtual object. In some embodiments, when multiple virtual objects are designated as target objects, the user optionally assign an order of the target objects via the haptic marking interface such that the path planner approaches the target objects in the specified order. In some embodiments, when the order is not explicitly specified otherwise, the path planner plans the path in accordance with predefined criteria set in the preprogrammed path planning instructions (e.g., based on the order that the virtual objects are inserted into the scene, based on the shortest path to reach all target objects, based on increasing/decreasing sizes of the virtual objects, etc.). In some embodiments, a target type virtual object is placed on a physical object or a portion of a physical object in the 3D scene, such that when the robot is instructed to manipulate the virtual object (e.g., grab and lift, or grab and rotate), the physical object or the portion of the physical object at the location of the virtual object is manipulated accordingly by the robot. In a more specific example, a target virtual object is placed on an edge of a revolving door, and when the robot approaches the edge of the revolving door and pushes on the target virtual object in accordance with instructions received from the path planner and controller, the revolving door will swing open. If no such virtual object is placed on the edge of the revolving door or when the virtual object is placed in the middle of the revolving door, the robot will not approach the revolving door (e.g., for seeing it as an obstacle) or will crash into the revolving door (e.g., for failing to opening it by pushing in the middle of the revolving door as opposed to the edge of the revolving door). In the above example, the preprogrammed algorithms and logic for generating the path plan and object manipulation instructions remain unchanged, and the resulting instructions sent to the robot are different because of the difference in environmental information received by the robot (e.g., the difference introduced by the virtual object(s)' presence/location(s)). In some embodiments, an insertion of a passage type of virtual object at a location of a virtualized physical object in the 3D scene causes the path planner to disregard the physical object as an obstacle in path planning. For example, the path planner will avoid going through a doorway covered by drapery in accordance with its preprogrammed obstacle avoidance instructions; however, when a passage type virtual object is placed on the drapery via the haptic marking interface by a user, the path planner will no longer treat the drapery as an obstacle when planning a path toward a target object on the other side of the door way. If the drapery happens to partially block the robot, the robot will push through the drapery to go through the doorway (e.g., the closed or half open drapery will be pushed open to let through the robot) when executing the path. In some embodiments, an insertion of a passage type virtual object that is placed over a physical object moves with the physical object in the 3D scene, such that the path planner does not treat the physical object as an obstacle irrespective of the change in location of the physical object. For example, the path planner will avoid a small rubber ball lying on the floor in accordance with its preprogrammed obstacle avoidance instructions; however, when a passage type virtual object is placed and attached on the virtualized rubber ball via the haptic marking interface by a user, the path planner will no longer treat the rubber ball as an obstacle when planning a path toward a target object in the scene. If the rubber ball happens to be in the path, the robot will approach and push against the ball (which will roll away or be pushed along) when executing the path.

In some embodiments, the haptic-marking interface allows the user to manipulate a virtual object already placed in the virtualized 3D scene, and provide haptic feedback to the user via the haptic-enabled input device that mimics reactions from the 3D environment through the virtual object.

In some embodiments, after a virtual object is placed on or against a surface in the virtualized physical environment, the user can interact with the virtual object, and experience different haptic feedback depending on the manner by which the user is interacting with the virtual object, and the spatial relationship between the virtual object and the virtualized physical environment, as well as physical characteristics of the virtual object and the virtualized physical environment. For example, a virtual object can be placed on a floor surface in the virtualized physical environment, and pushed or dragged on the floor surface; and the haptic-enabled input device provides haptic feedback that simulates the static and dynamic frictions between the virtual object and the floor surface. In another example, a virtual object can be pushed against a surface (e.g., sideways against a wall or another object, or downward against the floor, etc.), and the haptic-enabled input device provides haptic feedback that simulates the reactive force from the surface against the virtual object.

In FIG. 7B, a few examples are provided to illustrate the influence to path planning by the placement of various types of virtual objects (e.g., dome 718) into a virtualized physical environment, in accordance with some embodiments. FIG. 7B(a) illustrates a path 720-1 (e.g., a route of least resistance and distance) of a robot 102 would take to reach a target object 704. The path 720-1 is generated by the preprogrammed path-planning instructions of the path planer implemented at the robot or the server in accordance with the environment information provided to the path planner. FIG. 7B(b) illustrates a path 720-2 of the robot 102, when a series of waypoints 708 are laid down on the floor of the virtualized environment. The path 720-2 first goes through the series of waypoints and then turns toward the target object 704. The environment information provided to the path planner is changed from the scenario in FIG. 7B(a), and resulting in the change in the planned path. FIG. 7B(c) illustrates that a dome shaped virtual object 718-1 is placed in the scene, and the dome is of the "obstacle" object type. The path 720-3 is generated to avoid the obstacle 718-1 when moving toward the target 704. Even though the virtual dome does not exist in the physical environment, the environment information provided to the path planner is modified to include the presence of the dome, and as a result, the path planner generates a path that goes around the dome. FIG. 7B(d) illustrates that a dome-shaped shield 718-2 is placed over a pet that moves about the room. The dome-shaped shield 718-2 follows the pet's movement in real-time, and the path planner adjusts the path in accordance with the location of the dome shield 718-2. The environment information is continuously updated with the location of the pet (e.g., geometric center of the pet), but the calculation is greatly simplified in real-time, because even though the pet's shape continues to change (e.g., moving, running, rolling, etc.), the details of the pet's shape is replaced with the dome shield's shape, and the path planner will plan a path to steer clear of the dome, as opposed to the pet. FIG. 7B(e) illustrates that, there is a crack 722 on the floor which appears to be an obstacle to the path planner because the continuity of the floor is disrupted at the crack. However, when a passage dome object 718-3 is placed on a portion of the crack 722, the environment information provided to the path planner is modified, and the gap in the floor surface is bridged, and the path 720-5 is goes through the dome passable object over the crack, and goes directly toward the target 704. FIG. 7B(f) illustrates that, there are some obstacles 724 on the way to the target. The user uses the dome shaped measure object 718-4 to push through the gaps between obstacles. The size of the measure object 718-4 is selected to be the larger of the robot and the target, if the task is to move the target to a different location. In one location, the measure object 718-4 is stuck (e.g., the user will not be able to push through), and in another location, the measure object can pass through without problem. Thus, the user can, after trying out the two locations by pushing the dome measure object 718-4 against the two openings, either reset the object type at the narrow opening to obstacle, or reset the object type at the wide opening to passage, to cause the robot to move to the target through the wide opening. The path 720-6 is generated based on the modified environment information provided to the path planner.

FIG. 7C illustrates movement of a virtual object (e.g., a cube 726) in the virtualized physical environment, in accordance with some embodiments. As shown in FIG. 7C, the virtual object is pushed along the floor and ultimately against the box 704 in the virtualized physical environment. As the user pushes the virtual object, the movement of the virtual object is constrained by the geometry of the floor surface in the virtualized environment, and when the virtual object is pushed against the physical box in the scene, the movement of the virtual object is stopped. The haptic enabled input device provides force feedback that corresponds to the friction between the virtual object and the floor surface when the virtual object is pushed along the floor surface, and the reactive force from the physical box 704 when the virtual object is pushed against the physical box.

In some embodiments, the presently proposed mixed initiative remote robotic control system includes mechanisms that take into consideration of network latency when performing visual and haptic rendering, path planning, and/or physics simulations. In some embodiments, the latency-based adjustment is automatically triggered by the detection of latency exceeding a threshold amount (e.g., the network latency is monitored continuously) or when the user provides a request for adjusting for latency after seeing the effect of network latency (e.g., unexpected and/or unpredictable robot movement, or dithering movement of the robot) or an indicator value of the network latency (e.g., 100 ms, or 200 ms) through other latency monitoring systems.

The reasons that latency is an important consideration in path planning and operation control of robot for mixed-initiative remote robotic control include the following: (1) the amount of image and depth data that need to be transmitted over the network is very large; and (2) the user intervention is not continuous, but intermittent and unscheduled, and the robot has much time executing autonomous motion. To accommodate these characteristics, the control architecture of the system will be distributed in both the robot layer and the execution layer.

In some embodiments, the execution layer (e.g., execution layer 206) includes a task planner, a path supervisor, a path planner, and a primitive supervisor. The robot layer (e.g., robot layer 204) includes a trajectory planner, a controller and the robot. A user uses haptic interfaces to invoke high-level tasks, including haptic marking a position or insertion of a virtual object in the 3D scene, and haptic interaction with a virtual object. These operations are passed to the task planner. The task planner is a high-level manager to communicate with the plan supervisor. It can parse the task into micro-action plans, and receive the re-planning request. The plan supervisor can request and receive the path between two points from the path planner. In the presently disclosed framework, the path generation is based on a Rapidly-exploring Random Tree algorithm, in some embodiments. In a mixed-initiative control scenario, the human-in-the-loop interactions happen in the primitive supervisor module. The low level primitive supervisor receives the path information such as waypoints and micro actions from the plan supervisor. It will receive the planned path, and also the haptic marking path, and generate a goal position for the robot motion. In the robot layer, the trajectory planner monitors and controls the trajectory towards the goal position. The haptic marking path provides a marking point $x^m$, and the planned path provides a path point $x^p$. The goal position $x^g$ is chosen from these two points by choosing the maximal distance between the point and current robot position.

Network delays may influence the mapping and localization from KinectFusion. To compensate the delay, a method to generate a predicted goal position is proposed. Assuming current velocity of robot is $v_i=(a_i, b_i, c_i)$ at $i_{th}$ time step, a way to predict the next velocity is to compute the velocity and acceleration with the last several frames. Most Kalman filters are based on an empirical model of this linear form. A general linear model used to predict next velocity $v_{i+1}$ is Equation 2:

$$a_{i+1}=\alpha_0 a_i + \alpha_1 a_{i-1} \ldots \alpha_m a_{t-m} \; b_{i+1}=\beta_0 b_i + \beta_1 b-1 \ldots$$
$$\beta_m b_{t-m} \; c_{i+1}=\gamma_0 c_i + \gamma_1 c-1 \ldots \gamma_m c_{t-m} \quad (2)$$

For a given time series of points in a path, the matrix V is defined as Equation 3:

$$V = \begin{bmatrix} a_0 & \ldots & a_m & b_0 & \ldots & b_m & c_0 & \ldots & c_m \\ a_1 & \ldots & a_{m+1} & b_1 & \ldots & b_{m+1} & c_1 & \ldots & c_{m+1} \\ \vdots & & & & & & & & \\ a_i & \ldots & a_{i+m} & b_i & \ldots & b_{i+m} & c_i & \ldots & c_{i+m} \end{bmatrix} \quad (3)$$

Let v be the predicted position $(v_{m+1}, v_{m+2}, \ldots, v_{i+m+1}, \ldots)^T$. The problem now is to solve and obtain three parameter vectors $\alpha$, $\beta$, and $\gamma$. The general solution of these linear problems are shown as follows in Equation 4:

$$\alpha=(V^T V)V^T a \; \beta=(V^T V)V^T b \; \gamma=(V^T V)V^T c \quad (4)$$

Every time step, this linear prediction model generates new parameters, and then predicts the next goal position $x^g_{i+1}=x^g_i+v_{i+1}t$, where t is the round time delay. This goal position will be sent to the trajectory planner for the low-level autonomous control of the robot.

FIG. 8 is a flowchart of a method 800 of providing mixed-initiative robotic control, in accordance with some embodiments. The method 800 of providing mixed-initiative robotic control is performed (802) at a computing device having one or more processors and memory. The computing device communicably coupled to a robot and is configured to generate a planned path for the robot in accordance with a first set of preprogrammed path-planning instructions. The robot is configured to navigate within a physical environment in accordance with the planned path received from the computing device and locally-stored path-execution instructions. In some embodiments, the computing device is a server that is collocated with the robot (e.g., using the same local area network or in the same room). In some embodiments, the computing device is a server that is remotely located from the robot, and communicates with the robot over a wide area network, and may experience network delays when communicating with the robot over the network. In some embodiments, the computing device is a computer that is collocated with a human operator that facilitates remote interaction between the user and the robot.

In accordance with the method 800, the computing device displays (804) a control user interface (e.g., a control interface 700 that includes a graphical rendering 702 of the virtualized scene (e.g., displaying the point cloud or surfaces identified based on the image and depth data collected from the sensors at the location of the robot, e.g., with a frame rate corresponding to substantially real-time update) and various user interface controls (e.g., controls in 706, 710, 712, 714, and 716 in user interface 700 in FIG. 7A) for marking the virtualized scene and inserting virtual objects into the virtualized scene) via a display generation component (e.g., a display, a heads-up display, a projector, a touch-screen display, etc.) coupled to the computing device. The control user interface displays a virtual pointer object (e.g., virtual pointer 705) (e.g., a virtual hand, a cursor, an arrow-shaped position indicator, etc. that moves in the virtualized scene in accordance with a movement input of the user (e.g., provided by a mouse, joystick, touch-pad, haptic-enabled pointing device, etc.)) within a virtualized environment corresponding to a first physical environment currently surrounding the robot, wherein the virtualized environment is generated and updated in accordance with streaming environment data (e.g., streaming RGB image data and corresponding depth data, with a video frame rate (e.g., 10, 12, 24 frames per second)) received from a first set of sensors (e.g., RGBD camera 106) collocated with the robot (e.g., robot 102) (e.g., the first set of sensors may be affixed to the robot (e.g., on top of the robot, or at the "eye"-level of the robot, or on the ceiling of the room in which the robot is located)).

While displaying the virtual pointer object in the virtualized environment, the computing device detects (806) first user input via a haptic-enabled input device. The first user input includes a first movement input and one or more marking inputs at one or more locations along a movement path of the virtual pointer object in the virtualized environment. For example, a user may operate the haptic-enabled input device (e.g., a haptic-enabled 3D mouse 114) by moving a positioning portion of the input device in 3D, and cause corresponding movement of the virtual pointer object (e.g., pointer 705) in the virtualized environment. Based on the location of the virtual pointer object in the virtualized environment (e.g., as shown in the visual rendering region 702 of the control user interface 700) and based the haptic feedback provided to the user via the haptic-enabled input device (e.g., the haptic feedback causes the user to experience force and/or vibrations simulating reactive force (e.g., from impact, resistance to push/pull/press, etc.), dynamic and/or static friction between user's finger and the surfaces in the physical environment, textures of surfaces, slope of the surfaces, other physical geometrical characteristics of the surfaces, etc.), the user can determine when to mark the location as a waypoint or destination point or other types of marking points (e.g., handle for object manipulation, passage for going through a physical obstacle, etc.) and provides the required marking input (e.g., clicking a button, double tapping on a touch surface, activating a marking control in the control user interface, etc.) via the haptic-enabled input device (e.g., haptic-enabled input device 114).

In response to detecting the first user input (810): the computing device moves (812) the virtual pointer object along a first movement path in the virtualized environment in accordance with the first movement input, where the first movement path is constrained by one or more simulated surfaces in the virtualized environment. For example, the virtual pointer object can only move on the surface of the floor, and cannot penetrate the floor when moving along the floor represented in the virtualized environment.

In response to detecting the first user input (810): the computing device generates (814) haptic feedback via the haptic-enabled input device in accordance with simulated material and/or structural characteristics of the first movement path in the virtualized environment. The computing device modifies (816) at least a portion of the virtualized environment (e.g., marking the point cloud, saved as an ordered point set) that corresponds to the locations of the one or more marking inputs in the virtualized environment. The modified virtualized environment replaces the virtualized environment as environment basis for path planning for the robot within the first physical environment that is performed by the computing device in accordance with the first set of preprogrammed path-planning instructions.

In some embodiments, to generate haptic feedback via the haptic-enabled input device in accordance with simulated material and/or structural characteristics of the first movement path in the virtualized environment, the computing device performs the following operations. The computing device, in accordance with a movement of the first pointer object from a first location to a second location in the virtualized environment, updates a proxy position for generating a force feedback during the movement of the first pointer object. Updating the proxy position includes: in accordance with a determination that the first location corresponds to an initial contact with the virtualized environment along the first movement path, updating the proxy position to locate a nearest surface point from the first location; and in accordance with a determination that the first location is not the initial contact with the virtualized environment along the first movement path, updating the proxy position to locate a nearest surface point from an intersection point between a tangential constraint plane corresponding the first location and a normal line dropped to the tangential constraint plane from the first location. This is illustrated in FIG. 4 and accompanying descriptions. In some embodiments, updating the proxy position to locate a nearest surface point from the first location utilizes intermediate results computed for ray-casting for visual rendering of the one or more surfaces, and is completed in parallel to the ray-casting for visual rendering of the one or more surfaces.

In some embodiments, modifying at least a portion of the virtualized environment that corresponds to the locations of the one or more marking inputs in the virtualized environment includes marking a path that is to be followed by the robot (e.g., by marking 308), and the planned path generated in accordance with the first set of preprogrammed path-planning instructions is the marked path (e.g., as illustrated in FIG. 7B(b)).

In some embodiments, modifying at least a portion of the virtualized environment that corresponds to the locations of the one or more marking inputs in the virtualized environment includes marking a boundary that prevents crossing by the robot, and the planned path generated in accordance with the first set of preprogrammed path-planning instructions does not cross the boundary.

In some embodiments, modifying at least a portion of the virtualized environment that corresponds to the locations of the one or more marking inputs in the virtualized environment includes placing one or more virtual obstacles (e.g., obstacle 718-1) that are avoided by the robot, and the planned path generated in accordance with the first set of preprogrammed path-planning instructions precludes contact with the one or more virtual obstacles (e.g., as illustrated in FIG. 7B(c)).

In some embodiments, modifying at least a portion of the virtualized environment that corresponds to the locations of the one or more marking inputs in the virtualized environment includes placing one or more virtual passages (e.g., 718-3) at locations corresponding to physical objects in the first physical environment, wherein a path generated in accordance with the first set of preprogrammed path-planning instructions when the one or more virtual passages are not present precludes contact with the physical objects by the robot, and the planned path generated in accordance with the first set of preprogramed path-planning instructions when the one or more virtual passages are present does not preclude contact with the physical objects by the robot during navigation (e.g., as illustrated in FIG. 7B(e)).

In some embodiments, modifying at least a portion of the virtualized environment that corresponds to the locations of the one or more marking inputs in the virtualized environment includes segmenting the virtualized environment from the locations of the one or more marking inputs in the virtualized environment, and marking one or more physical objects corresponding to result of the segmenting as targets for the navigation in accordance with the first set of preprogrammed path-planning instructions (e.g., as illustrated in FIG. 7A, box 704 is marked as a target). In some embodiments, the computing device provides a high-level instruction regarding manipulating the one or more physical objects in accordance with a second set of preprogrammed object-manipulation instructions, wherein the robot manipulates the one or more physical objects in accordance with the high-level instructions and locally-stored task-execution instructions. For example, the high-level instruction is "rotate the box", and the robot rotates the box in accordance with locally-stored task-execution instructions that includes instructions for approaching the box, identifying surfaces of the box, identifying firm locations on the surfaces of the box for pushing the box, and pushing the identified locations to rotate the box to a desired amount.

It should be understood that the particular order in which the operations in method 800 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1000) are also applicable in an analogous manner to method 800 described above with respect to FIG. 8. For brevity, these details are not repeated here.

The operations in the information processing methods described above are, optionally implemented by running one or more functional modules in information processing apparatus such as general purpose processors or application specific chips.

FIG. 9 is a flowchart of a method 900 of performing interactive object segmentation from streaming surfaces, in accordance with some embodiments. The method 900 of performing interactive object segmentation from streaming surfaces is performed (902) at a computing device having one or more processors and memory. The computing device is communicably coupled, via a network, to a set of sensors and a robot collocated in a first physical environment. The computing device communicably coupled to a robot and is configured to generate a planned path for the robot in accordance with a first set of preprogrammed path-planning instructions. The robot is configured to navigate within a physical environment in accordance with the planned path received from the computing device and locally-stored path-execution instructions. In some embodiments, the computing device is a server that is collocated with the robot (e.g., using the same local area network or in the same room). In some embodiments, the computing device is a server that is remotely located from the robot, and communicates with the robot over a wide area network, and may experience network delays when communicating with the robot over the network. In some embodiments, the computing device is a computer that is collocated with a human operator that facilitates remote interaction between the user and the robot.

In method 900, the computing device receives (904) an environment data stream from the set of sensors, the environment data stream including correlated image and depth data capturing the first physical environment. The computing device displays (906), via a display generation component (e.g., display 112), a virtualized representation of the first physical environment, in a user interface region (e.g., user interface region 702 in FIGS. 7A-7C), wherein the virtualized representation of the first physical environment is generated and updated in accordance with the environment data stream. While displaying the virtualized representation of the first physical environment, the computing device receives (908) a marking input from a haptic-enabled input device. A position of the marking input in the virtualized representation of the first physical environment is determined in accordance with the marking input and is constrained by the a first virtualized surface in the virtualized representation of the first physical environment. In response to receiving the marking input (910), the computing device performs (912) object segmentation from the position of the marking input on the correlated image and depth data, including, for a respective time-step in updating the virtualized representation of the first physical environment in accordance with the environment data stream: clustering (912) pixels from a first position in the image data that corresponds to the position of the marking input to form a first cluster; segmenting out a first labeled object based on the first cluster and the depth data corresponding to the first cluster; fusing the first labeled object and the depth data into a first Truncated Signed Distance Function (TSDF) representation of the first physical environment corresponding to the respective time-step; and obtaining a first segmented point cloud from the first TSDF representation fused with the first labeled object and the depth data corresponding to the first cluster. This is illustrated in FIG. 6 and accompanying descriptions.

In some embodiments, providing the first segmented point cloud including the first labeled object as input for path planning and/or task execution to be performed by a robot with respect to a first physical object corresponding to the first labeled object, in accordance with preprogrammed instructions.

In some embodiments, the computing device generates haptic feedback via the haptic-enabled input device in response to the marking input, including: in accordance with a determination that the location of the marking input corresponds to an initial contact with the virtualized environment, updating a proxy position to locate a nearest surface point from the location of the marking input; and in accordance with a determination that the location of the marking input is a successive location of contact with the virtualized environment along a movement path, updating the proxy position to locate a nearest surface point from an intersection point between a tangential constraint plane corresponding the first location and a normal line dropped to the tangential constraint plane from the first location. This is illustrated in FIG. 4 and accompanying descriptions. In some embodiments, updating the proxy position to locate a nearest surface point from the first location is performed using the first TSDF representation of the first physical environment corresponding to the respective time-step.

In some embodiments, the computing device marks the first labeled object as an obstacle in accordance with the marking input, wherein the robot avoids the first labeled object during navigation on a path generated in accordance with the first set of preprogrammed instructions (e.g., as illustrated in FIG. 7B(c)).

In some embodiments, the computing device marks the first labeled object as a target in accordance with the marking input, wherein the robot approaches the first labeled object during navigation on a path generated in accordance with a first set of preprogrammed path-planning instructions (e.g., as illustrated in FIGS. 7B(a)-7B(f)).

In some embodiments, the computing device marks the first labeled object as a passage in accordance with the marking input, wherein the robot avoids the first labeled object during navigation on a path generated in accordance with a first set of preprogrammed path-planning instructions when the first labeled object is not marked as a passage, and the robot will not avoid the first labeled object during navigation on a path generated in accordance with the first set of preprogrammed path-planning instructions when the first labeled object is marked as a passage (e.g., as illustrated in FIG. 7B(e)).

In some embodiments, the computing device marks the first labeled object as a subject of manipulation in accordance with the marking input. The computing device provides a high-level instruction regarding manipulating the first labeled object to the robot, wherein the robot manipulates a physical object corresponding to the first labeled object the high-level instructions generated in accordance with a second set of pre-programmed object-manipulation instructions.

It should be understood that the particular order in which the operations in method 900 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 1000) are also applicable in an analogous manner to method 900 described above with respect to FIG. 8. For brevity, these details are not repeated here.

The operations in the information processing methods described above are, optionally implemented by running one or more functional modules in information processing apparatus such as general purpose processors or application specific chips.

FIG. 10 is a flowchart of a method of providing mixed-initiative robotic control, in accordance with some embodiments. The method 1000 of providing mixed-initiative robotic control is performed (1002) at a computing device having one or more processors and memory. The computing device (e.g., server 110) communicably coupled to a robot and is configured to generate a planned path for the robot in accordance with a first set of preprogrammed path-planning instructions. The robot (e.g., robot 102) is configured to navigate within a physical environment in accordance with the planned path received from the computing device and locally-stored path-execution instructions.

In method 1000, the computing device displays (1004) a control user interface (e.g., control user interface 700) via a display generation component coupled to the computing device, including displaying a virtualized environment (e.g., in region 702) corresponding to a first physical environment currently surrounding the robot (e.g., robot 102), wherein the virtualized environment is generated and updated in accordance with streaming environment data received from a first set of sensors (e.g., 3D camera 106) collocated with the robot. While displaying the virtualized environment, the computing device detects (1006) a first user input inserting a first virtual object at a first location in the virtualized environment (e.g., via the control user interface 700). In response to detecting the first user input, the computing device modifies (1008) the first virtualized environment in accordance with the insertion of the first virtual object at the first location, wherein the first virtual object at the first location causes the robot to execute a first navigation path in the physical environment that is generated in accordance with the first set of pre-programmed path-planning instructions. While displaying the first virtual object at the first location in the virtualized environment and while the robot is executing the first navigation path in the physical environment, the computing device detects (1010) a second user input, including detecting a first movement input directed to the first virtual object via a haptic-enabled input device. In response to detecting the second user input, the computing device moves (1012) the first virtual object along a first movement path to a second location in the virtualized environment in accordance with the first movement input, wherein the first movement path is constrained by one or more simulated surfaces in the virtualized environment, wherein the first virtual object at the second location causes the robot to execute a modified navigation path in the physical environment that is generated in accordance with the first set of pre-programmed path-planning instructions. This is illustrated in FIGS. 7B-7C and accompanying descriptions.

In some embodiments, during movement of the first virtual object along the first movement path to the second location in the virtualized environment, the computing device provides haptic feedback via the haptic-enabled input device (e.g., input device 114) in accordance with simulated friction forces between the first virtual object and a simulated surface at a current location of the first virtual object.

In some embodiments, the first virtual object has a predefined size and shape. During movement of the first virtual object along the first movement path to the second location in the virtualized environment, the computing device detects that the first virtual object has come in contact with a first simulated surface in a current direction of movement of the first virtual object. In response to detecting that the first virtual object has come in contact with the first simulated surface in the current direction of movement of the first virtual object, the computing device provides haptic feedback via the haptic-enabled input device in accordance with simulated reactive forces from the first simulated surface to the first virtual object. This is illustrated in FIG. 4, for example.

In some embodiments, the first virtual object has a predefined size and shape. During movement of the first virtual object along the first movement path to the second location in the virtualized environment, the computing device detects that the first virtual object has come in contact with a second virtual object that was previously placed in the simulated environment in the current direction of movement of the first virtual object. In response to detecting that the first virtual object has come in contact with the second virtual object in the current direction of movement of the first virtual object, the computing device provides haptic feedback via the haptic-enabled input device in accordance with simulated reactive forces from the second virtual object to the first virtual object. This is illustrated in FIG. 5, for example.

In some embodiments, the first virtual object is marked as an obstacle and the robot avoids the first virtual object during navigation on a path generated in accordance with the first set of pre-programmed instructions (e.g., as illustrated in FIG. 7B(c)).

In some embodiments, the first virtual object is marked as a target and the robot approaches the first labeled object during navigation on a path generated in accordance with the first set of pre-programmed instructions (e.g., as illustrated in FIGS. 7B(a)-(f)).

In some embodiments, the first virtual object is marked as a passage, the presence of the first virtual object overrides presence of a physical obstacle during the robot's navigation on a path generated in accordance with the first set of preprogrammed path-planning instructions (e.g., as illustrated in FIG. 7B(e)).

In some embodiments, to detect the first user input inserting the first virtual object at the first location in the virtualized environment, the computing device performs the following operations: detecting a first input directed to a first position in the virtualized environment that corresponds to a first simulated surface; in response to detecting the first input directed to the first position, providing first haptic feedback via the haptic-enabled device indicating that the first position is on the first simulated surface; detecting a second input marking the first position in the virtualized environment as part of a first boundary of the first virtual object; detecting a third input directed to a second position in the virtualized environment that corresponds to a second simulated surface; in response to detecting the second input directed to the second position, providing second haptic feedback via the haptic-enabled device indicating that the second position is on the second simulated surface; detecting a fourth input marking the second position in the virtualized environment as part of a second boundary of the first virtual object; and generating the first virtual object in accordance with the first position and the second position.

In some embodiments, the computing device marks the first labeled object as a subject of manipulation in accordance with the marking input. The computing device provides a high-level instruction regarding manipulating the first labeled object to the robot, wherein the robot manipulates a physical object corresponding to the first labeled object the high-level instructions generated in accordance with a second set of pre-programmed object-manipulation instructions.

It should be understood that the particular order in which the operations in method 1000 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 900) are also applicable in an analogous manner to method 1000 described above with respect to FIG. 8. For brevity, these details are not repeated here.

The operations in the information processing methods described above are, optionally implemented by running one or more functional modules in information processing apparatus such as general purpose processors or application specific chips.

Figure 11:
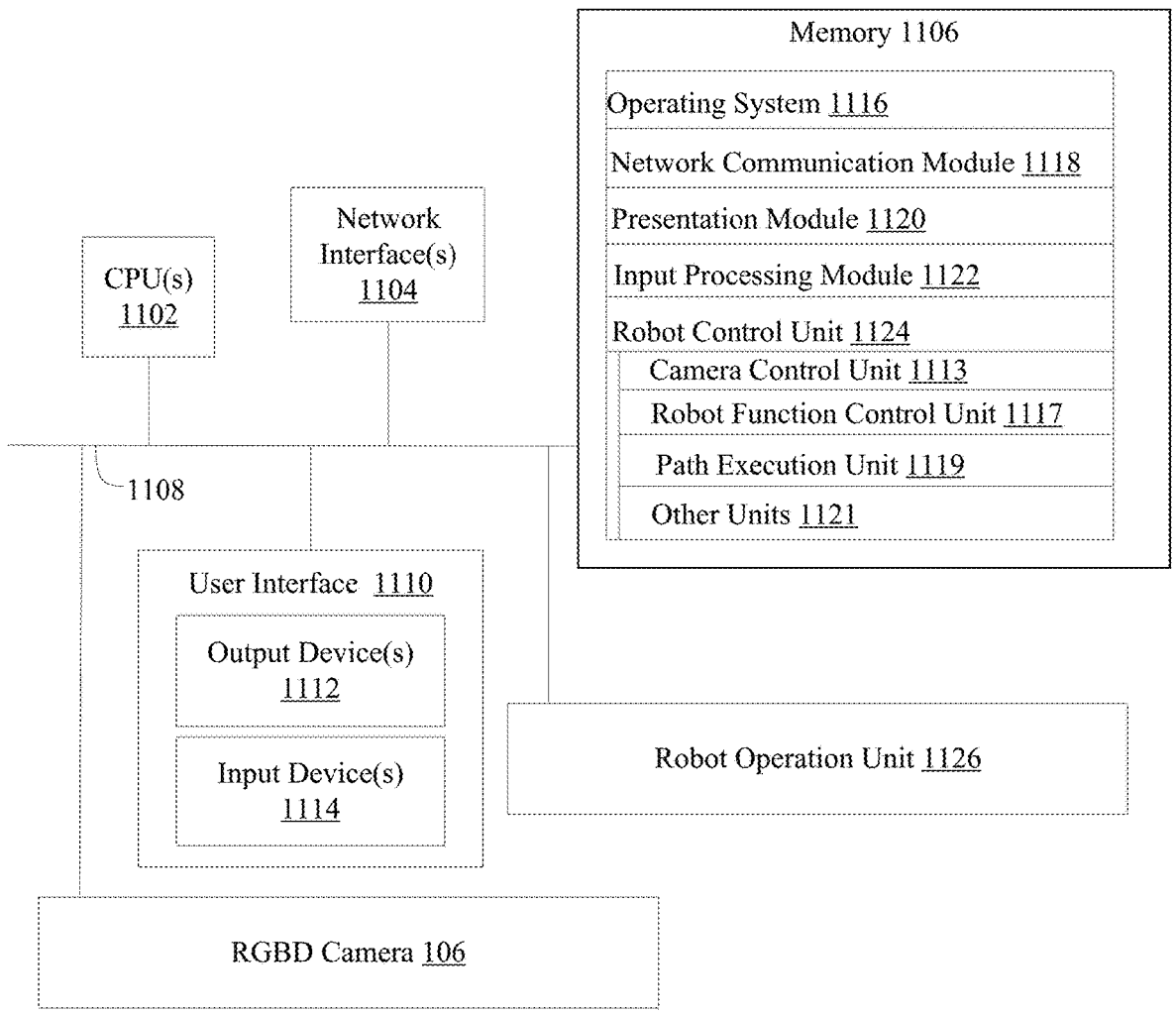
FIG. 11 is a block diagram illustrating an exemplary robot in accordance with some embodiments.

FIG. 11 is a block diagram illustrating an exemplary robot 102 in accordance with some embodiments.

The robot 102 includes one or more processing units (CPUs) 1102, one or more network interfaces 1104 (e.g., including the I/O interface to server 110), memory 1106, and one or more communication buses 1108 for interconnecting these components (sometimes called a chipset). The memory 1106 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 1106, optionally, includes one or more storage devices remotely located from the one or more processing units 1102. The memory 1106, or alternatively the non-volatile memory within the memory 1106, includes a non-transitory computer readable storage medium. In some implementations, the memory 1106, or the non-transitory computer readable storage medium of the memory 1106, stores the following programs, modules, and data structures, or a subset or superset thereof:

- Operating system 1116 including procedures for handling various basic system services and for performing hardware dependent tasks;
- Network communication module 1118 for connecting the robot 102 to other computing devices;
- Presentation module 1120 for enabling presentation of information at the robot 102 via the one or more output devices 1112 (e.g., displays, speakers, etc.) associated with the user interface 1110;
- Input processing module 1122 for detecting one or more user inputs or interactions from one of the one or more input devices 1114 and interpreting the detected input or interaction;
- Robot Control Unit 1124 for controlling functions of the robot 102, including camera control unit 1113 for controlling RGBD camera 106 of the robot 102, robot function control unit 1117 for controlling the robot operation unit 1126 of the robot, path execution unit 1119 for executing a path in accordance with a high level instructions of a path planner, and other units for implementing the functions of the robot 102 as described herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1106, optionally, stores a subset of the modules and data structures identified above. Furthermore, the memory 1106, optionally, stores additional modules and data structures not described above.

In some implementations, at least some of the functions of the robot 102 are performed by the server 110, and the corresponding sub-modules of these functions may be located within the server 110 rather than the robot 102. The robot 102 shown in FIG. 11 is merely illustrative, and different configurations of the modules for implementing the functions described herein are possible in various implementations.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 1106, optionally, stores a subset of the modules and data structures identified above. Furthermore, the memory 1106, optionally, stores additional modules and data structures not described above.

Figure 12:
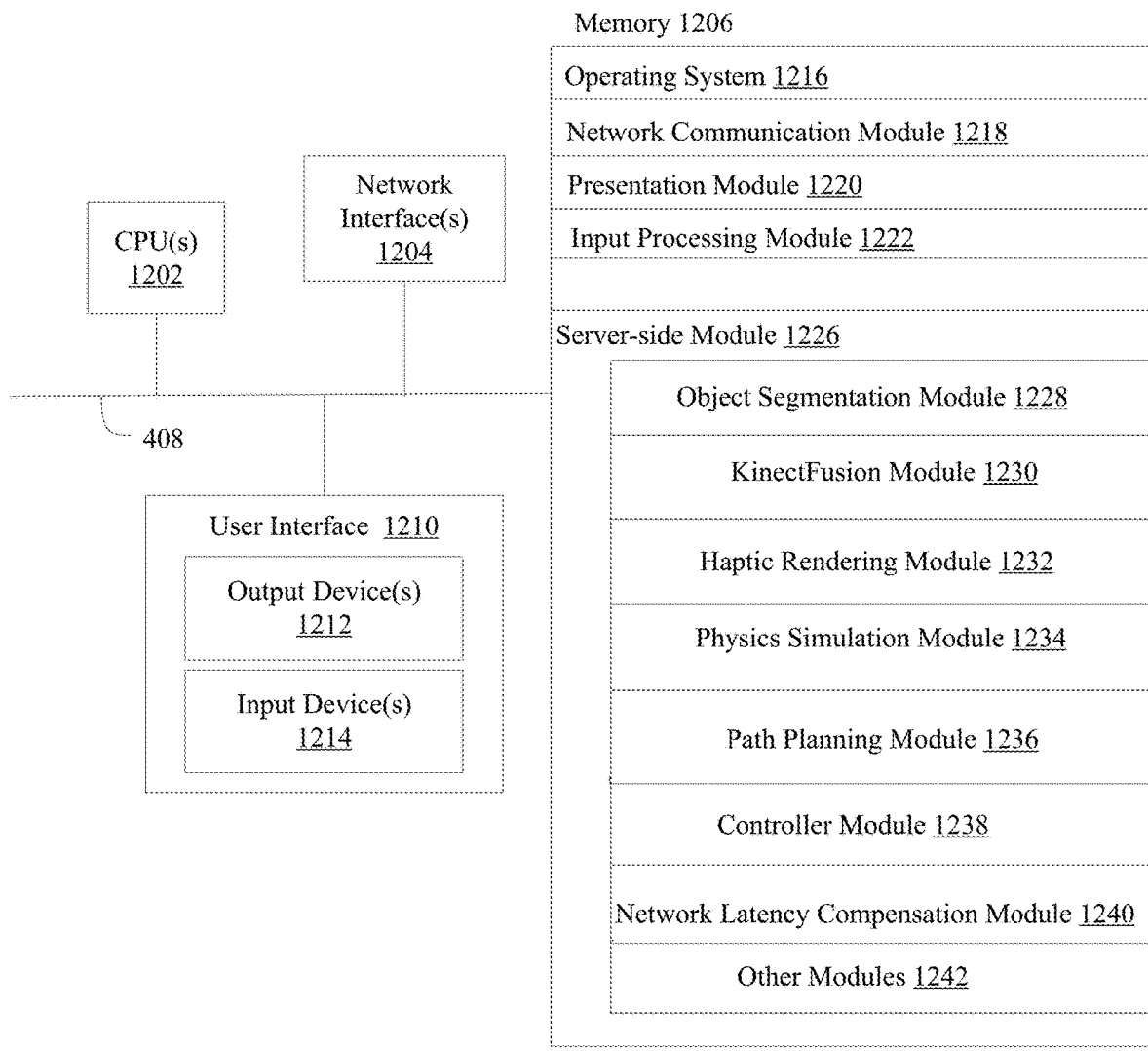
FIG. 12 is a block diagram illustrating an exemplary server in accordance with some implementations.

FIG. 12 is a block diagram illustrating an exemplary server 110 in accordance with some implementations. The server system 110, typically, includes one or more processing units (CPUs) 1202, one or more network interfaces 1204 (e.g., including the I/O interface to one or more robots 102 and the I/O interface to one or more user-side device 1300), memory 1206, and one or more communication buses 1208 for interconnecting these components (sometimes called a chipset). The memory 1206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 1206, optionally, includes one or more storage devices remotely located from the one or more processing units 1202. The memory 1206, or alternatively the non-volatile memory within the memory 1206, includes a non-transitory computer readable storage medium. In some implementations, the memory 1206, or the non-transitory computer readable storage medium of the memory 1206, stores the following programs, modules, and data structures, or a subset or superset thereof:

Operating system 1216 including procedures for handling various basic system services and for performing hardware dependent tasks;

Network communication module 1218 for connecting the server 110 to other computing devices (e.g., the user-side device 1300 and the robots 102 (including e.g., camera(s) 106));

Presentation module 1220 for enabling presentation of information at the server 110 via the one or more output devices 1212 (e.g., displays, speakers, etc.) associated with the user interface 1210;

Input processing module 1222 for detecting one or more user inputs or interactions from one of the one or more input devices 1214 and interpreting the detected input or interaction;

Server-side modules 1226 for controlling functions of the server 110, including object segmentation module 1228 for performing object segmentation in the virtualized environment, KinectFusion module 1230 for generating and updating the virtualized environment based on the image and depth data stream received from the robot, Haptic rendering module 1232 for generating haptic feedback based on the user's input provided via the haptic enabled input device and based on the location of the input in the virtualized environment, physics simulation module for generating reaction and friction force rendering as well as object interaction models in the virtualized environment, path planning module 1236 for generating a planned path based on the virtualized environment and haptics markings and virtual objects present in the virtualized environment, controller module 1238 for controlling path execution by the robot, network latency compensation module 1240 for adjusting path planning based on network delays, and other modules 1242 for implementing other functions of the server 110 as described herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1206, optionally, stores a subset of the modules and data structures identified above. Furthermore, the memory 1206, optionally, stores additional modules and data structures not described above.

In some implementations, at least some of the functions of the server 110 are performed by the robot 110 or the user-side device 1300, and the corresponding sub-modules of these functions may be located within the server robot or user-side device rather than the server 110. The server 110 shown in FIG. 12 is merely illustrative, and different configurations of the modules for implementing the functions described herein are possible in various implementations.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 1206, optionally, stores a subset of the modules and data structures identified above. Furthermore, the memory 1206, optionally, stores additional modules and data structures not described above.

Figure 13:
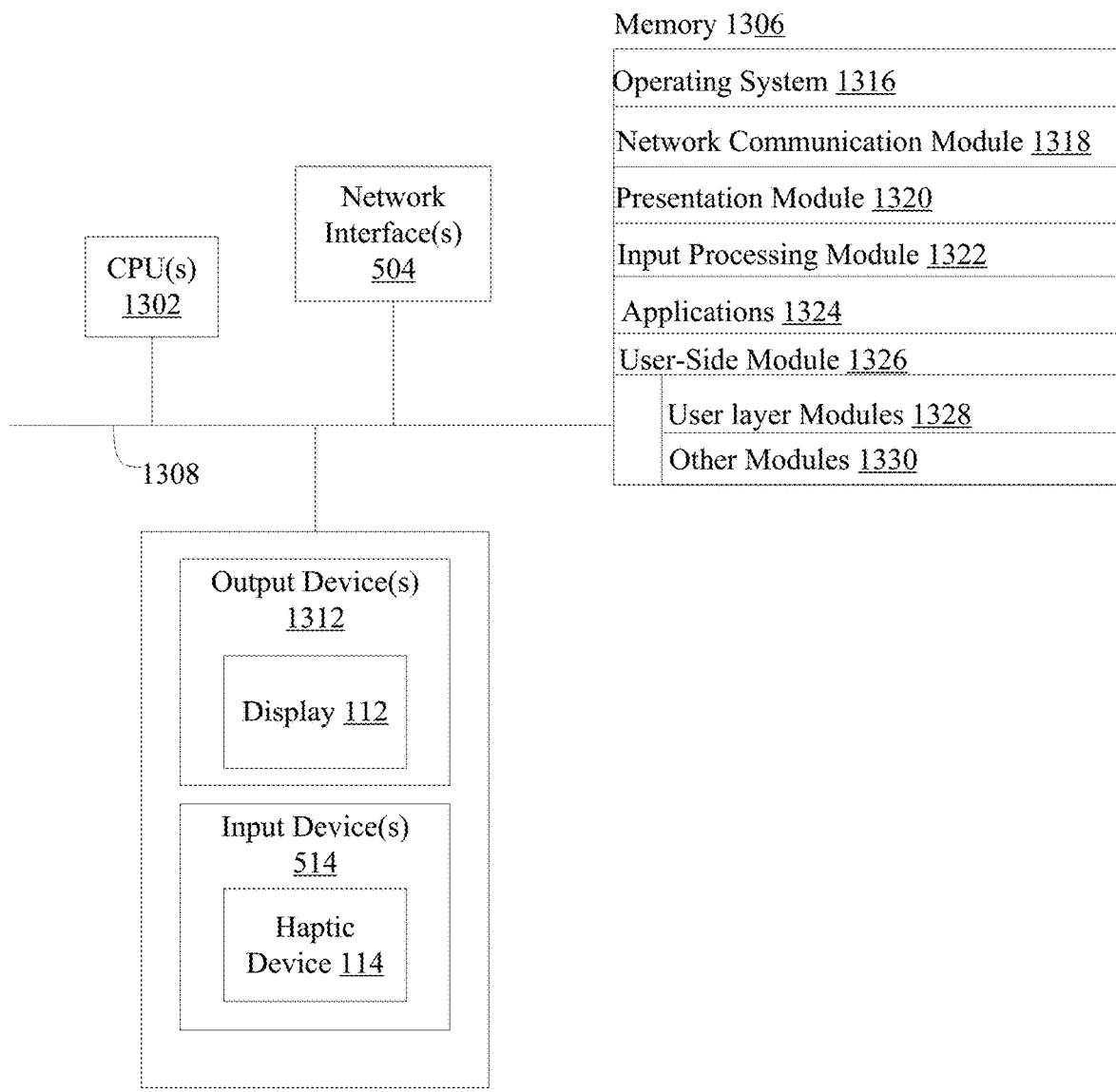
FIG. 13 is a block diagram illustrating an exemplary user-side device in accordance with some implementations.

FIG. 13 is a block diagram illustrating an exemplary user-side device 1300 in accordance with some implementations. The user-side device 1300, typically, includes one or more processing units (CPUs) 1302, one or more network interfaces 1304 (e.g., including the I/O interface to server 110), memory 1306, and one or more communication buses 1308 for interconnecting these components (sometimes called a chipset). The memory 1306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 1306, optionally, includes one or more storage devices remotely located from the one or more processing units 1302. The memory 1306, or alternatively the non-volatile memory within the memory 1306, includes a non-transitory computer readable storage medium. In some implementations, the memory 1306, or the non-transitory computer readable storage medium of the memory 1306, stores the following programs, modules, and data structures, or a subset or superset thereof:

Operating system 1316 including procedures for handling various basic system services and for performing hardware dependent tasks;

Network communication module 1318 for connecting the server 110 to other computing devices;

Presentation module 1320 for enabling presentation of information at the user-side device 1300 via the one or more output devices 1312 (e.g., displays 112, speakers, haptic-enabled input device 114, etc.) associated with the user interface 1310;

Input processing module 1322 for detecting one or more user inputs or interactions from one of the one or more input devices 1314 (e.g., haptic-enabled input device 114) and interpreting the detected input or interaction;

Applications 1324 for implementing various user-level functions, such as word processing, drawing, etc.

User-side modules 1326 for controlling functions of the user-side devices, including user layer module 1328 and other modules 1330 for implementing other functions of the user-side device as described herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1306, optionally, stores a subset of the modules and data structures identified above. Furthermore, the memory 1306, optionally, stores additional modules and data structures not described above.

In some implementations, at least some of the functions of the server 110 are performed by the user-side device 1300, and the corresponding sub-modules of these functions may be located within the server rather than the user-side device 1300. The user-side device 1300 shown in FIG. 13 is merely illustrative, and different configurations of the modules for implementing the functions described herein are possible in various implementations.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 1306, optionally, stores a subset of the modules and data structures identified above. Furthermore, the memory 1306, optionally, stores additional modules and data structures not described above.

What is claimed is:

1. A method of providing mixed-initiative robotic control, including:
at a computing device having one or more processors and memory, wherein the computing device is communicably coupled to a robot and is configured to generate a planned path for the robot in accordance with a first set of preprogrammed path-planning instructions, and the robot is configured to navigate within a physical environment in accordance with the planned path received from the computing device and locally-stored path-execution instructions; displaying a control user interface via a display generation component coupled to the computing device, including displaying a virtual pointer object within a virtualized environment corresponding to the physical environment currently surrounding the robot, wherein the virtualized environment is generated and updated in accordance with streaming environment data received from a first set of sensors collocated with the robot; while displaying the virtual pointer object in the virtualized environment, detecting a first user input via a haptic-enabled input device, including detecting a first movement input and one or more marking inputs at one or more locations along a movement path of the virtual pointer object in the virtualized environment; in response to detecting the first user input: moving the virtual pointer object along the movement path in the virtualized environment in accordance with the first movement input, wherein the movement path is constrained by one or more simulated surfaces in the virtualized environment; generating haptic feedback via the haptic-enabled input device in accordance with simulated material and/or structural characteristics of the movement path in the virtualized environment; and modifying at least a portion of the virtualized environment that corresponds to the locations of the one or more marking inputs in the virtualized environment, wherein the modified virtualized environment replaces the virtualized environment as environment basis for path planning for the robot within the physical environment that is performed by the computing device in accordance with the first set of preprogrammed path-planning instructions.

2. The method of claim 1, wherein generating haptic feedback via the haptic-enabled input device in accordance with simulated material and/or structural characteristics of the movement path in the virtualized environment includes: in accordance with a movement of the pointer object from a first location to a second location in the virtualized environment, updating a proxy position for generating a force feedback during the movement of the pointer object, including: in accordance with a determination that the first location corresponds to an initial contact with the virtualized environment along the movement path, updating the proxy position to locate a nearest surface point from the first location; and in accordance with a determination that the first location is not the initial contact with the virtualized environment along the movement path, updating the proxy position to locate a nearest surface point from an intersection point between a tangential constraint plane corresponding the first location and a normal line dropped to the tangential constraint plane from the first location.

3. The method of claim 1, wherein modifying at least a portion of the virtualized environment that corresponds to the locations of the one or more marking inputs in the virtualized environment includes marking a path that is to be followed by the robot, and the planned path generated in accordance with the first set of preprogrammed path-planning instructions is the marked path.

4. The method of claim 1, wherein modifying at least a portion of the virtualized environment that corresponds to the locations of the one or more marking inputs in the virtualized environment includes marking a boundary that prevents crossing by the robot, and the planned path generated in accordance with the first set of preprogrammed path-planning instructions does not cross the boundary.

5. The method of claim 1, wherein modifying at least a portion of the virtualized environment that corresponds to the locations of the one or more marking inputs in the virtualized environment includes placing one or more virtual obstacles that are avoided by the robot, and the planned path generated in accordance with the first set of preprogrammed path-planning instructions precludes contact with the one or more virtual obstacles by the robot.

6. The method of claim 1, wherein modifying at least a portion of the virtualized environment that corresponds to the locations of the one or more marking inputs in the virtualized environment includes placing one or more virtual passages at locations corresponding to physical objects in the physical environment, wherein the planned path generated in accordance with the first set of preprogrammed path-planning instructions when the one or more virtual passages are not present precludes contact with the physical objects by the robot, and the planned path generated in accordance with the first set of preprogramed path-planning instructions when the one or more virtual passages are present does not preclude contact with the physical objects by the robot during navigation.

7. The method of claim 1, wherein modifying at least a portion of the virtualized environment that corresponds to the locations of the one or more marking inputs in the virtualized environment includes segmenting the virtualized environment from the locations of the one or more marking inputs in the virtualized environment, and marking one or more physical objects corresponding to a result of the segmenting as targets for the navigation in accordance with the first set of preprogrammed path-planning instructions.

8. A computing device for providing mixed-initiative robotic control, comprising: one or more processors; and memory storing instructions, wherein: the computing device is communicably coupled to a robot and is configured to generate a planned path for the robot in accordance with a first set of preprogrammed path-planning instructions, the robot is configured to navigate within a physical environment in accordance with the planned path received from the computing device and locally-stored path-execution instructions, and the instructions, when executed by the one or more processors, cause the processors to perform operations comprising: displaying a control user interface via a display generation component coupled to the computing device, including displaying a virtual pointer object within a virtualized environment corresponding to the physical environment currently surrounding the robot, wherein the virtualized environment is generated and updated in accordance with streaming environment data received from a first set of sensors collocated with the robot; while displaying the virtual pointer object in the virtualized environment, detecting a first user input via a haptic-enabled input device, including detecting a first movement input and one or more marking inputs at one or more locations along a movement path of the virtual pointer object in the virtualized environment; and in response to detecting the first user input: moving the virtual pointer object along the movement path in the virtualized environment in accordance with the first movement input, wherein the movement path is constrained by one or more simulated surfaces in the virtualized environment; generating haptic feedback via the haptic-enabled input device in accordance with simulated material and/or structural characteristics of the movement path in the virtualized environment; and modifying at least a portion of the virtualized environment that corresponds to the locations of the one or more marking inputs in the virtualized environment, wherein the modified virtualized environment replaces the virtualized environment as environment basis for path-planning for the robot within the physical environment that is performed by the computing device in accordance with the first set of preprogrammed path-planning instructions.

9. The computing device of claim 8, wherein generating haptic feedback via the haptic enabled input device in accordance with simulated material and/or structural characteristics of the movement path in the virtualized environment includes: in accordance with a movement of the pointer object from a first location to a second location in the virtualized environment, updating a proxy position for generating a force feedback during the movement of the pointer object, including: in accordance with a determination that the first location corresponds to an initial contact with the virtualized environment along the movement path, updating the proxy position to locate a nearest surface point from the first location; and in accordance with a determination that the first location is not the initial contact with the virtualized environment along the first movement path, updating the proxy position to locate a nearest surface point from an intersection point between a tangential constraint plane corresponding the first location and a normal line dropped to the tangential constraint plane from the first location.

10. The computing device of claim 8, wherein modifying at least a portion of the virtualized environment that corresponds to the locations of the one or more marking inputs in the virtualized environment includes marking a path that is to be followed by the robot, and the planned path generated in accordance with the first set of preprogrammed path-planning instructions is the marked path.

11. The computing device of claim 8, wherein modifying at least a portion of the virtualized environment that corresponds to the locations of the one or more marking inputs in the virtualized environment includes marking a boundary that prevents crossing by the robot, and the planned path generated in accordance with the first set of preprogrammed path-planning instructions does not cross the boundary.

12. The computing device of claim 8, wherein modifying at least a portion of the virtualized environment that corresponds to the locations of the one or more marking inputs in the virtualized environment includes placing one or more virtual obstacles that are avoided by the robot, and the planned path generated in accordance with the first set of preprogrammed path-planning instructions precludes contact with the one or more virtual obstacles by the robot.

13. The computing device of claim 8, wherein modifying at least a portion of the virtualized environment that corresponds to the locations of the one or more marking inputs in the virtualized environment includes placing one or more virtual passages at locations corresponding to physical objects in the physical environment, wherein a path generated in accordance with the first set of preprogrammed path-planning instructions when the one or more virtual passages are not present precludes contact with the physical objects by the robot, and the planned path generated in accordance with the first set of preprogramed path-planning instructions when the one or more virtual passages are present does not preclude contact with the physical objects by the robot during navigation.

14. The computing device of claim 8, wherein modifying at least a portion of the virtualized environment that corresponds to the locations of the one or more marking inputs in the virtualized environment includes segmenting the virtualized environment from the locations of the one or more marking inputs in the virtualized environment, and marking one or more physical objects corresponding to a result of the segmenting as targets for the navigation in accordance with the first set of preprogrammed path-planning instructions.

15. A computer-readable storage medium for providing mixed-initiative robotic control, wherein the computer-readable storage medium stores instructions, the instructions, when executed by one or more processors of a computing device, cause the computing device to perform operations, wherein: the computing device is communicably coupled to a robot and is configured to generate a planned path for the robot in accordance with a first set of preprogrammed path-planning instructions, the robot configured to navigate within a physical environment in accordance with the planned path received from the computing device and locally-stored path-execution instructions, and the operations include: displaying a control user interface via a display generation component coupled to the computing device, including displaying a virtual pointer object within a virtualized environment corresponding to the physical environment currently surrounding the robot, wherein the virtualized environment is generated and updated in accordance with streaming environment data received from a first set of sensors collocated with the robot; while displaying the virtual pointer object in the virtualized environment, detecting a first user input via a haptic-enabled input device, including detecting a first movement input and one or more marking inputs at one or more locations along a movement path of the virtual pointer object in the virtualized environment; and in response to detecting the first user input: moving the virtual pointer object along the movement path in the virtualized environment in accordance with the first movement input, wherein the movement path is constrained by one or more simulated surfaces in the virtualized environment; generating haptic feedback via the haptic-enabled input device in accordance with simulated material and/or structural characteristics of the movement path in the virtualized environment; and modifying at least a portion of the virtualized environment that corresponds to the locations of the one or more marking inputs in the virtualized environment, wherein the modified virtualized environment replaces the virtualized environment as environment basis for path-planning for the robot within the physical environment that is performed by the computing device in accordance with the first set of preprogrammed path-planning instructions. environment as environment basis for path planning for the robot within the first physical environment that is performed by the computing device in accordance with the first set of preprogrammed path-planning instructions.

16. The computer-readable storage medium of claim 15, wherein generating haptic feedback via the haptic-enabled input device in accordance with simulated material and/or structural characteristics of the movement path in the virtualized environment includes: in accordance with a movement of the pointer object from a first location to a second location in the virtualized environment, updating a proxy position for generating a force feedback during the movement of the pointer object, including: in accordance with a determination that the first location corresponds to an initial contact with the virtualized environment along the movement path, updating the proxy position to locate a nearest surface point from the first location; and in accordance with a determination that the first location is not the initial contact with the virtualized environment along the movement path, updating the proxy position to locate a nearest surface point from an intersection point between a tangential constraint plane corresponding the first location and a normal line dropped to the tangential constraint plane from the first location.

17. The computer-readable storage medium of claim 15, wherein modifying at least a portion of the virtualized environment that corresponds to the locations of the one or more marking inputs in the virtualized environment includes marking a path that is to be followed by the robot, and the planned path generated in accordance with the first set of preprogrammed path-planning instructions is the marked path.

18. The computer-readable storage medium of claim 15, wherein modifying at least a portion of the virtualized environment that corresponds to the locations of the one or more marking inputs in the virtualized environment includes marking a boundary that prevents crossing by the robot, and the planned path generated in accordance with the first set of preprogrammed path-planning instructions does not cross the boundary.

19. The computer-readable storage medium of claim 15, wherein modifying at least a portion of the virtualized environment that corresponds to the locations of the one or more marking inputs in the virtualized environment includes placing one or more virtual obstacles that are avoided by the robot, and the planned path generated in accordance with the first set of preprogrammed path-planning instructions precludes contact with the one or more virtual obstacles by the robot.

20. The computer-readable storage medium of claim 15, wherein modifying at least a portion of the virtualized environment that corresponds to the locations of the one or more marking inputs in the virtualized environment includes placing one or more virtual passages at locations corresponding to physical objects in the physical environment, wherein a path generated in accordance with the first set of preprogrammed path-planning instructions when the one or more virtual passages are not present precludes contact with the physical objects by the robot, and the planned path generated in accordance with the first set of preprogramed path-planning instructions when the one or more virtual passages are present does not preclude contact with the physical objects by the robot during navigation.

* * * * *